(12) United States Patent
Sumi et al.

(10) Patent No.: US 7,250,961 B2
(45) Date of Patent: Jul. 31, 2007

(54) LIGHT BEAM SCANNING METHOD AND APPARATUS COMPENSATING FOR DEFECTS

(75) Inventors: Katsuto Sumi, Kanagawa (JP); Fumiaki Miyamaru, Osaka (JP)

(73) Assignee: Fujifilm Corporation, Tokyo (JP)

( * ) Notice: Subject to any disclaimer, the term of this patent is extended or adjusted under 35 U.S.C. 154(b) by 373 days.

(21) Appl. No.: 10/225,482

(22) Filed: Aug. 22, 2002

(65) Prior Publication Data

US 2003/0137580 A1    Jul. 24, 2003

(30) Foreign Application Priority Data

| Aug. 22, 2001 | (JP) | ............................. 2001-251267 |
| Aug. 30, 2001 | (JP) | ............................. 2001-261194 |
| Aug. 31, 2001 | (JP) | ............................. 2001-263096 |
| Aug. 31, 2001 | (JP) | ............................. 2001-263097 |

(51) Int. Cl.
   *B41J 27/00* (2006.01)
(52) U.S. Cl. ....................................... 347/244; 347/258
(58) Field of Classification Search ................ 347/239, 347/241–244, 255, 256–261, 232–233; 250/236, 250/201.9, 201.7; 349/74; 359/18, 289, 359/1, 212; 256/512
   See application file for complete search history.

(56) References Cited

U.S. PATENT DOCUMENTS 4,480,892 A * 11/1984 Ishikawa ..................... 359/18
4,848,879 A * 7/1989 Nishimura et al. ......... 359/289
5,682,214 A * 10/1997 Amako et al. ................ 349/74
5,907,153 A    5/1999 Gouch ......................... 250/236
6,108,025 A *  8/2000 Li et al. ...................... 347/256
6,496,293 B2 * 12/2002 Kawamura .................. 359/212

FOREIGN PATENT DOCUMENTS

| JP | 63-239402   | * 10/1988 |
| JP | 8-130612 A  |   5/1996  |
| JP | 11-274632   | * 10/1999 |

* cited by examiner

*Primary Examiner*—Hai Pham
(74) *Attorney, Agent, or Firm*—Sughrue Mion, PLLC

(57) ABSTRACT

The light beam scanning method and apparatus perform light beam scanning of a cylindrical internal surface scanning type, a cylindrical external surface scanning type, and a plane scanning type, where when a sheet-like object to be scanned is scanned by a light beam emitted from a light source, at least one of lateral displacement and longitudinal displacement of a light beam and aberration in an optical system is compensated by controlling a wave front of the light beam with a wavefront control device. Also, when the lateral displacement, longitudinal displacement, and the aberration are caused by change of an environmental temperature, it is possible to measure the environmental temperature and to perform compensation through the control of the wave front by the wavefront control device based on the measured environmental temperature. Also, when scanning is performed using a plurality of light beams, it is possible to align scanning positions of the plurality of light beams in an auxiliary scanning direction in a parallel manner by displacing the scanning positions through the control of the wave front of at least one light beam using the wavefront control device.

46 Claims, 21 Drawing Sheets

LIGHT BEAM SCANNING METHOD AND APPARATUS COMPENSATING FOR DEFECTS

BACKGROUND OF THE INVENTION

The present invention relates to a light beam scanning method and apparatus.

In more detail, the present invention relates to a light beam scanning method and apparatus that realize high-precision light scanning by compensating for an error in a condensing spot position due to lateral displacement of a light beam and longitudinal displacement (defocus) of the light beam caused by various factors and degradation (blurring) in a condensing spot shape due to aberration in an optical system. That is, the present invention relates to a light beam scanning method and apparatus that uses a light scanning technique with which there is performed high-quality image recording or high-precision image reading.

In particular, the present invention relates to a cylindrical internal surface scanning type light beam scanning method and apparatus that use a light scanning technique with which during cylindrical internal surface scanning type light beam scanning, there is compensated for at least one of lateral displacement of a light beam, longitudinal displacement of the light beam, and aberration in an optical system caused by various factors and there is performed high-quality image recording or high-precision image reading.

Also, the present invention relates to a cylindrical external surface scanning type light beam scanning method and apparatus that use a light beam spot compensating light scanning technique that realizes high-precision light scanning by compensating for at least one of lateral displacement of a light beam, longitudinal displacement of the light beam, and aberration in an optical system caused by various factors or the changing of an environmental temperature, with the cylindrical external surface scanning type light beam scanning method and apparatus being suitably applicable to any optical recording head such as a CTP (Computer to Plate), an image setter, or a DDCP (Direct Digital Color Proofer). Alternatively, the present invention relates to a light beam scanning method and apparatus that use a light beam spot temperature compensating light scanning technique that is suitably applicable to any of the light recording heads described above.

Also, the present invention particularly relates to a cylindrical internal surface scanning type light beam scanning apparatus that functions as a cylindrical internal surface scanning type image recording apparatus that records an image by performing main scanning on a recording medium, such as a photosensitive material, held on a cylindrical internal surface using a plurality of light beams modulated in accordance with image information.

There have been developed light beam scanning apparatuses such as a light beam reading apparatus that performs the reading of an image using a light beam and a laser printer that records an image by guiding a light beam from a laser or the like, onto a recording medium using a scanning optical system and by exposing the recording medium through the scanning of the light beam. These light beam scanning apparatuses include, in the category thereof, a flat bed type that scans a laser beam on a plane-shaped recording medium, a cylindrical external surface scanning type (external surface cylinder type (outer drum type)) that scans a laser beam on a recording medium placed on an outer peripheral surface of a rotating drum, and a cylindrical internal surface scanning type (internal surface cylinder type (inner drum type)) that scans a laser beam on a recording medium placed on the inner peripheral surface of a drum.

Among these, the inner drum type light beam scanning apparatus does not suffer from the peeling of a recording medium during recording and excels in high-speed scanning ability, cost efficiency, and the like. Also, the quality of a recording light beam is high, so that the inner drum type light beam scanning apparatus is widely used.

A conventional inner drum type light beam scanning apparatus is shown in FIG. 20. As shown in FIG. 20, the inner drum type light beam scanning apparatus 500 is basically constructed of a drum 504 on whose cylindrical internal peripheral surface there is placed a recording medium (recording sheet) 502 on which an image or the like is to be recorded, a light source (laser beam generator) 506 that generates a laser beam L, and a laser beam scanning portion 508 that is disposed concentrically with the center axis of the drum 504 and scans the laser beam L on the recording medium 502.

The laser beam scanning portion 508 includes a condensing lens 510 that is set on the same optical axis as the laser beam L, a light deflector (spinner) 512 that has a reflection surface set at an inclination angle of substantially 45° with respect to the incident direction of the laser beam L, and a motor 514 that rotationally drives the spinner 512 about the optical axis of the laser beam L.

The laser beam L outputted from the laser beam generator 506 is then condensed by the condensing lens 510, is reflected by the reflection surface of the spinner 512 that is rotated by the motor 514 at high speed, and is guided onto the recording medium 502. During this operation, the laser beam L is scanned (main-scanned) by the rotating spinner 512 while rotating on the recording medium 502 at high speed. Also, the laser beam scanning portion 508 is moved for auxiliary scanning in a direction shown by the arrow X in the drawing by an unillustrated traverse that moves for auxiliary scanning. In this manner, an image or the like is recorded on the recording medium 502.

In the inner drum type light beam scanning apparatus, however, there is a problem in that because the spinner that is a deflector is rotated, its reflection surface is distorted by a centrifugal force, the wave front of the laser beam that scans the recording medium is distorted, and the quality of a recorded image is lowered.

In view of this problem, U.S. Pat. No. 5,907,153 discloses a technique of compensating for distortion in a reflected beam caused by distortion in the reflection surface due to the rotation of this spinner using an optical path length compensating device of a transmission type or a reflection type.

That is, as shown in FIG. 21, in the light beam scanning type image recording apparatus, a laser beam generated from a laser diode 601 connected to a modulator 602 and passed through a light level controller 603 is reflected by a compensating device 604, passes trough a beam expander 605, a resolution selector 606, a focusing lens 607, and the like, is reflected by a reflection surface 610 of a rotating spinner 611, and is scanned on a recording medium 608 placed on the internal surface of a cylinder 609, thereby recording an image or the like. During this operation, there is made an attempt to compensate for aberration or distortion caused by the rotation of the spinner 611 with this compensating device 604.

As shown in FIG. 22, the compensating device 604 includes an electrode 615 and a piezo device 614 that are disposed under a plane-shaped mirror 613. As shown in FIG. 23, the compensating device 604 further includes electrodes 616A to 616L that are divided into 612 portions ant are disposed in a circumferential manner under the electrode 615 and the piezo device 614. As shown in FIG. 21, the electrodes 615 and 616A to 616L are controlled by a memory 619, a microprocessor 618, and a voltage source 620.

Also, by deforming the piezo device 614 through the control of the electrodes 616A to 616L in synchronism with the rotation of the spinner 611, the distortion in the laser beam caused by the spinner 611 is compensated for through the deforming of the mirror 613.

However, as causes of the degradation in the quality of a recorded image or the degradation in a figure accuracy of image reading, aside from the aforementioned distortion in the laser beam, there are cited the increase of a spot diameter, the degradation in a condensing spot shape such as the collapse of a spot diameter, and lateral displacement of a light beam where the position of a dot for recording an image is shifted from a target position (that is, an error in the condensing spot position). The cause of the degradation in the condensing spot shape and the error in the condensing spot position is not limited to the aforementioned distortion in the rotating spinner. That is, in addition to causes resulting from the spinner, there are cited, for instance, causes resulting from longitudinal displacement (defocus) of a light beam, aberration in an optical system, and the like. The causes due to the spinner are dynamic, while the causes due to the aberration in the optical system are caused by a lens itself or the combination of lenses and are static. Also, in addition to the above, there are cited causes such as an error from the roundness of the drum (eccentricity of the drum or a cylindrical error), a deviation of a traverse that is moved for auxiliary scanning from a straight line property, a mismatch between the moving direction of the traverse and the center line of the drum (parallel shifting or crossing), or a variation in the thickness of a recording medium.

Here, in short, the degradation in the condensing spot shape refers to longitudinal displacement (defocus) of a laser beam in an optical axis direction (z direction), the increase of a spot diameter due to aberration in an optical system, and the collapse of a spot shape. Also, the error in the condensing spot position refers to displacement of the recording position of a laser beam on the recording medium (in the x and y directions).

Up to now, in order to circumvent the degradation in the condensing spot shape caused by the aforementioned various factors (hereinafter represented by the longitudinal displacement of the light beam and the aberration in the optical system) and the error in the condensing spot position (hereinafter represented by the lateral displacement of the light beam) and in order to obtain high-quality recorded image, there is no choice other than relying on high-precision processing or high-precision adjustment, which eventually leads to a problem in that the cost of the apparatus is increased.

Incidentally, as described above, as one light beam scanning apparatus, there is a cylindrical external surface scanning type light beam scanning apparatus.

As described above, this apparatus is also referred to as the outer drum type. In this apparatus, a recording beam is imaged on a recording medium wound around the external peripheral surface of a drum (recording drum) that rotates at constant speed, and at the same time, a scanning optical system is moved for the auxiliary scanning in the rotation axis direction of the drum, thereby scanning the recording medium with a light beam.

Up to now, it has been known that in the outer drum type light beam scanning apparatus, the lateral displacement of a recording light beam, blurring due to aberration in the optical system, and longitudinal displacement of the recording light beam are caused by various factors to be described below and image quality is degraded.

For instance, due to the eccentricity or distortion in a cylindrical direction caused during the manufacturing of a drum, a variation in the thickness of a recording medium, such as a plate or a film, wound around the drum external peripheral surface, and the like, there occurs lateral displacement of a light beam or longitudinal displacement of the light beam on a recording surface while the drum is making one rotation.

Such lateral displacement of the light beam on the recording surface is also caused by the distortion or bending in a rail of an auxiliary scanning mechanism that has the scanning optical system perform auxiliary scanning, the bending in an exposure surface plate, an error in the auxiliary scanning sending speed due to an error in a lead pitch of an auxiliary scanning ball screw of the auxiliary scanning mechanism, or the like.

Further, shifting of a figure is caused by displacement of a recording beam caused during the spiral exposure using a multi-beam. As described above, due to various factors, there occur lateral displacement of a recording beam and degradation in image quality such as figure accuracy. Up to now, these problems have been coped with only by processing each construction element, such as a drum, with high precision. This means that there has been taken no effective measure.

Also, in the case of the CTP or the like, a plate made of aluminum is wound around the external surface of a drum. During the rotation of the drum, this plate is pulled outwardly by a centrifugal force and is placed in a state where the plate is floated from the drum external surface, which causes longitudinal displacement. Alternatively, in the case where minute dust is sandwiched between a recording medium, such as a plate or a film, wound around the drum external surface and the drum external surface, the recording medium is floated from the drum external surface at a corresponding position and there occurs longitudinal displacement in a like manner. Further, if the rail of the auxiliary scanning mechanism (traverse) for moving the scanning optical system for auxiliary scanning in the rotation direction of a drum is distorted or bent, there occurs longitudinal displacement in accordance with the auxiliary scanning.

Up to now, such longitudinal displacement is compensated for by moving the position of a lens system for imaging light emitted from a light source.

As shown in FIG. 24, for instance, a light beam emitted from a light source 700 is guided onto a recording medium 708 wound around the external surface of a recording drum 706 through a first lens group 702 and a second lens group 704. In an exposing apparatus that performs scan exposure, the second lens group 704 is moved as indicated by the broken line in the drawing. Thus, the aforementioned longitudinal displacement is compensated for, thereby correcting the point of a recorded image.

Alternatively, as shown in FIG. 25, by moving the whole of the optical system including the light source 700, the first lens group 702, and the second lens group 704, the longitudinal displacement is compensated for.

However, there is a problem in that if there is made an attempt to compensate for the lateral displacement of a light beam by relying on the high-precision processing of a drum and the like, the product price is raised.

Also, as described above, with the method with which the longitudinal displacement of a light beam is compensated for by moving a lens group and the like, there are moved the heavy-weighted lens group and the like, so that it is impossible to expect high-speed response, and for instance, it has been extremely difficult to compensate for longitudinal displacement resulting from the aforementioned causes such as dust. Also, the lens group is mechanically moved, so that there is a danger that vibrations caused by the mechanical moving exert an adverse effect on recording accuracy.

Consequently, in order to eliminate the lateral displacement or longitudinal displacement of a light beam, it has conventionally been required to process each construction element like a drum with high precision, to add a device that removes dust and the like, and to take other measures, which causes a problem in that the price of a product is raised.

Also, there has conventionally been known that if an environmental temperature is changed during the light scanning in these light beam scanning apparatuses, lateral displacement of a recording light beam (displacement of a recording position on the recording medium surface) and longitudinal displacement of the recording light beam occur due to various factors to be described below, which leads to the degradation in image quality.

In the case of the outer drum type, for instance, the lateral displacement and longitudinal displacement of a recording beam are caused by the degradation in figure accuracy, such as the magnification accuracy or registration accuracy, caused by the expansion or the shrinking of a drum in its diameter direction due to the changing of the environmental temperature, the elongation of a surface plate supporting the drum or an auxiliary scan exposure head in the optical axis direction, or the like.

In the case of the inner drum type, the lateral displacement of the recording beam is caused by the shrinking in the drum diameter direction due to the changing of the environmental temperature, tilt of a lens, displacement of a spinner mirror, or the like. Also, longitudinal displacement of a recording beam is caused by the changing of a focal distance of a lens glass material due to the changing of the environmental temperature, the shrinking in the drum diameter direction, the changing of the position of a spinner in the optical axis direction, or the like.

Also, in the case of a flat bed type, lateral displacement of a recording beam is caused by displacement of a light deflector due to the changing of the environmental temperature, the elongation of a flat bed, the tilt shifting of a long mirror, or the like. Also, longitudinal displacement of a recording beam is caused by the fluctuations of a distance between lenses on an optical surface plate due to the changing of the environmental temperature, the changing of a focal distance of a lens glass material, the displacement of a long mirror in the optical axis direction, or the like.

Such lateral displacement of a recording beam due to various factors resulting from the changing of the environmental temperature has conventionally been compensated for by processing each construction element, such as a drum, with high precision.

Also, the longitudinal displacement of a recording beam due to the changing of the environmental temperature is coped with by moving the position of a lens system for imaging light emitted from a light source or by selecting an appropriate glass material for a lens.

For instance, as a method of compensating for the longitudinal displacement of a recording beam, in the case of the outer drum type, as shown in FIG. 24, light emitted from the light source 700 is converted into parallel light using the first lens group 702, this parallel light is condensed by the second lens group 704, and the condensed light is imaged on the recording medium 708 wound around the external peripheral surface of the drum 706. During this operation, in the case where there occurs longitudinal displacement of the recording beam due to the changing of the environmental temperature, as indicated by the broken line in the drawing, the longitudinal displacement is compensated for by moving the position of the second lens group 704.

Also, as a method of compensating for the longitudinal displacement, in the case of the inner drum type, as shown in FIG. 26, a laser light emitted from the light source (LD, laser diode) 710 is guided to the spinner 720 through the lenses 712, 714, 716, and 718 and the like, is reflected by the reflection surface of the spinner forming an angle of substantially 45° with respect to the optical axis, and is imaged on the recording medium 722 placed on a drum (not shown). During this operation, in the case where there occurs longitudinal displacement of a laser beam due to the changing of the environmental temperature, by selecting an optimum glass material for the lens 718 that is closest to the spinner 720 in the drawing, the longitudinal displacement is compensated for.

However, if there is made an attempt to compensate for the lateral displacement of the recording beam due to the changing of the environmental temperature by relying on the high-precision processing of a drum and the like, there occurs a problem in that the price of a product is raised.

Also, with the aforementioned method with which the longitudinal displacement of the recording beam due to the changing of the environmental temperature is compensated for by moving the position of the lens system, heavy-weighted lenses are mechanically moved, so that there is a danger that vibrations generated by the mechanical moving exert an adverse effect on recording accuracy, which causes a problem in that there is a fear of the stability of the system being lacked.

Further, with the aforementioned method with which the longitudinal displacement is compensated for by a lens glass material, there occurs a problem in that a certain restriction is put on the glass material for the lens, there occurs the lowering of the beam quality (degradation in the beam diameter or the like), and the price of a product is raised depending on the glass material for the lens.

Also, the degradation in the condensing spot shape of a light beam is caused not only by longitudinal displacement of a light beam but also by aberration in a scanning optical system or the like. Also, as a result of the changing of the shape or the characteristics of the lens glass material itself used in a scanning optical system due to the changing of the environmental temperature, the aberration in the scanning optical system also changes and the degradation state of the condensing spot shape changes. There is a problem in that in order to cope with such degradation in the condensing spot shape due to the aberration in the scanning optical system and the like and the changing of the degradation state, there is taken no effective measure other than the use of a high-priced lens glass material with less aberration.

Also, as described above, in a light beam scanning apparatus, as an image recording apparatus that records an image on a recording sheet like a recording material using a laser beam, there are used a plane scanning (flat bed) type image recording apparatus that performs recording by irradiating a laser beam onto a plane-shaped recording sheet that is conveyed for auxiliary scanning in the main scanning direction, a cylindrical external surface scanning (outer drum) type image recording apparatus that performs recording by irradiating a laser beam on a recording sheet stuck on the external peripheral surface of a rotating drum, a cylindrical internal surface scanning (inner drum) type image recording apparatus that performs recording by irradiating a laser beam on a recording sheet stuck on the cylindrical internal surface, and the like.

Among these, the inner drum type image recording apparatus has come to be frequently used because a recording sheet is stuck on the internal surface of a cylinder so that there occurs no peeling of the recording sheet during recording, the size accuracy of an image to be recorded is high, and this recording apparatus is excel in the high-speed scanning property, cost efficiency, and the like.

As described above, in the inner drum type image recording apparatus, for instance, a light scanner (spinner), whose reflection surface is set at an angle of substantially 45° with respect to the incident direction of a laser beam, is disposed on the center axis of a cylinder and this reflection surface is rotated about the center axis, thereby scanning the laser beam on the recording sheet.

Incidentally, in the inner drum type image recording apparatus constructed in this manner, there is made an attempt to improve the recording speed by performing scanning using a plurality of laser beams. In this case, if the plurality of laser beams are simply made incident on a light scanner, it is impossible to have the laser beams scan on a recording sheet in a straight manner. Consequently, it becomes impossible to perform precise image recording. If scanning lines are formed on a recording sheet using three laser beams #1 to #3 arranged in parallel at regular intervals, for instance, aside from a scanning line formed by the laser beam #2 that is made incident on the rotation center of the reflection surface, bent scanning lines are formed on the recording sheet by the laser beams #1 and #3 that are made incident off the rotation axis of the reflection surface, as shown in FIG. 27.

This bending of a scanning line is caused by the rotation of the reflection surface that has been set at an angle of substantially 45° with respect to the incident direction of the laser beam.

That is, as shown in FIGS. 28A to 28C, a light scanner 802, whose reflection surface 804 is set at an angle of substantially 45° with respect to the incident directions of the laser beams #1 to #3, is disposed on the center axis 806 of the cylinder and the reflection surface 804 is rotated about the center axis 806. As a result, in the case where the laser beams #1 to #3 are scanned on a recording sheet, when the reflection surface 804 of the light scanner 802 is set in the direction of FIG. 28A (the minor axis of the reflection surface 804 coincides with the Y axis), three laser beams #1, #2, and #3 that are made incident on the minor axis of the reflection surface 804 under a state where these laser beams are parallel to the Z axis are reflected along the X-Y plane, and reach the recording sheet S under a state where these beams advance on the same scanning line. Also, when the reflection surface 804 is rotated from the state shown in FIG. 28A by 90° and is placed in a state shown in FIG. 28B, the laser beams #1, #2, and #3 are reflected along the Y-Z plane and reach the recording sheet S under a state where these laser beams #1, #2, and #3 are separated from each other. When the reflection surface 804 is further rotated from the state shown in FIG. 28B by 90° and is placed in the direction shown in FIG. 28C, the laser beams #1, #2, and #3 are reflected along the X-Y plane again and reach the recording sheet S under a state where these beams advance on the same scanning line.

The positions of the laser beams #1, #2, and #3 on the reflection surface 804 that are made incident on the surface 804 in this manner fluctuate due to the rotation of the light scanner 802, so that aside from the scanning line formed by the laser beam #2 that is made incident on the rotation axis of the reflection surface 804, there are formed bent scanning lines on the recording sheet S, as shown in FIG. 27.

Incidentally, in order to cope with this problem in that scanning lines are bent, JP 08-130612 A discloses an inner drum type image recording apparatus that is capable of forming a scanning line that is parallel to the main scanning direction through the deflection of each laser beam that is made incident separately from the rotation axis of the reflection surface 804 using an acoustic optical device or an electrooptical device.

However, the acoustic optical device and the electrooptical device are extremely high-priced elements, so that there arises a problem in that the inner drum type image recording apparatus will cost much.

Also, in the case where the scanning position on the recording sheet S in the main scanning direction and the auxiliary scanning direction is displaced, it is required that a plurality of acoustic optical devices and electrooptical devices are used for one laser beam, which causes a problem in that the cost is further increased.

SUMMARY OF THE INVENTION

The present invention has been made in the light of the conventional problems described above and has a first object to provide a light beam scanning method and apparatus that make it possible to obtain a high-quality image with a low-priced apparatus by compensating for displacement and degradation caused by various factors other than displacement and degradation caused by a spinner in the manner described above and in particular compensating for longitudinal displacement of a light beam (defocus), degradation in a condensing spot shape due to aberration in an optical system, and lateral displacement of the light beam using a simple construction. The present invention has a second object to provide a cylindrical internal surface scanning type light beam scanning method and apparatus to which such a light beam scanning method and apparatus are applied.

Also, the present invention has been made in the light of the aforementioned conventional problems and, in addition to the first object, has a third object to provide a cylindrical external surface scanning type light beam scanning method and apparatus that realize a stabilized system that compensates for lateral displacement of a light beam on a recording surface, longitudinal displacement of the light beam, and aberration in an optical system caused by various factors described above with a low-priced apparatus without replacing each construction element, such as a drum, with a high-precision construction element, without mechanically moving a lens itself unlike in the conventional case, without processing each construction element, such as a drum, with high precision, and by suppressing the adverse effect of vibrations and the like.

Also, the present invention has been made in the light of the aforementioned conventional problems and, in addition to the third object described above, has a fourth object to provide a light beam scanning method and apparatus that is capable of, with a lower-priced apparatus, easily compensating for lateral displacement of a light beam (displacement of the beam on a recording surface), longitudinal displacement of the light beam, and aberration in an optical system caused by aforementioned various factors resulting from the changing of the environmental temperature without replacing each construction element, such as a drum, with a high-precision construction element, without mechanically moving a heavy-weighted lens, and without selecting a lens glass material.

Further, in order to solve the aforementioned problems, the present invention has a fifth object to provide a light beam scanning apparatus that is a cylindrical internal surface scanning type image recording apparatus that uses a plurality of beams with which it is possible to perform scanning parallel to the main scanning direction without using a high-priced acoustic optical device and electrooptical device.

DETAILED DESCRIPTION OF THE INVENTION

A light beam scanning method and apparatus according to the present invention will be described in detail below based on preferred embodiments shown in the accompanying drawings.

First, a cylindrical internal surface scanning type light beam scanning method and apparatus according to the second and sixth aspects of the present invention, to which a light beam scanning method and apparatus according to the first and fifth aspects of the present invention is applied, will be described with reference to FIGS. 1 to 4.

Figure 1:
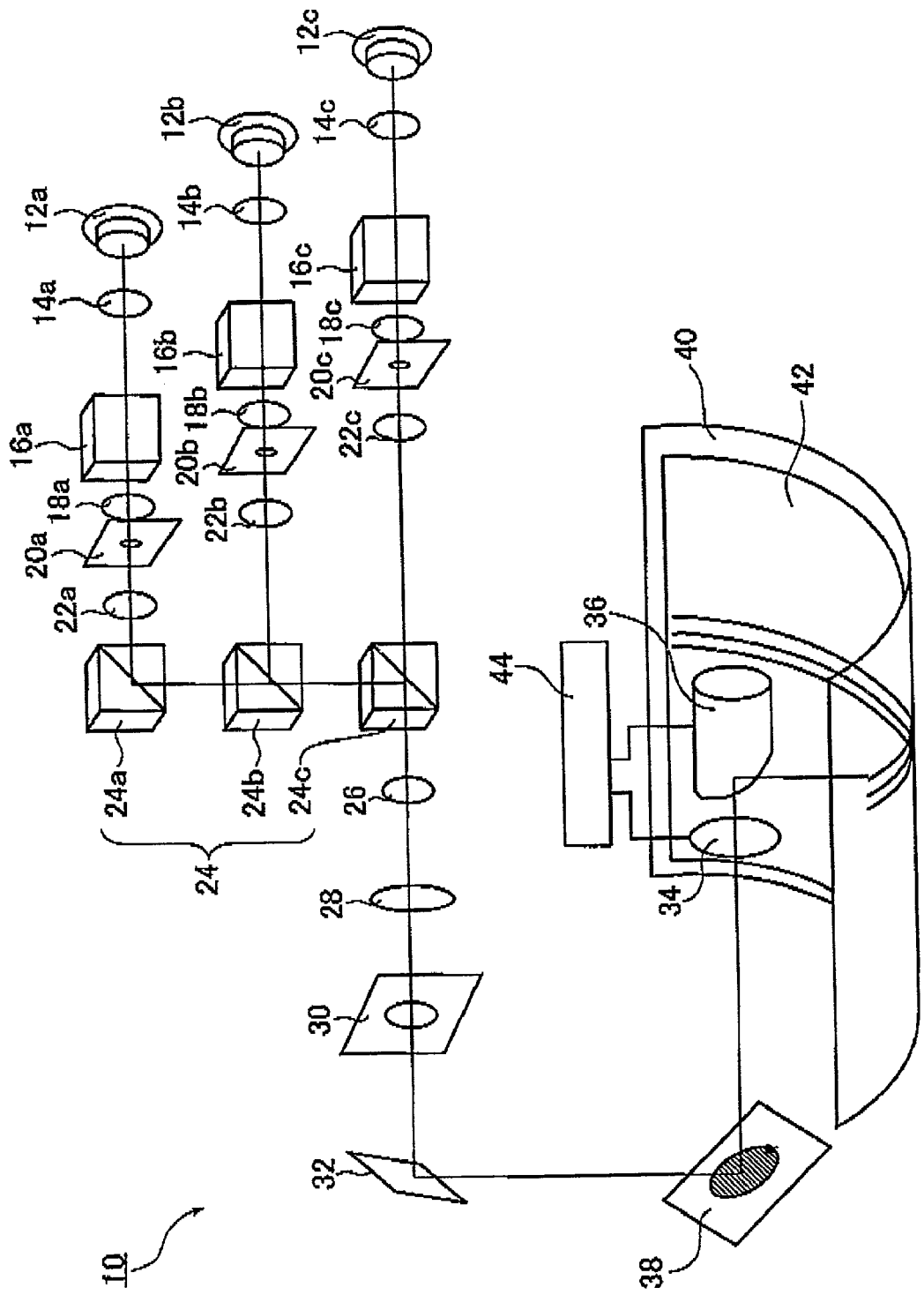
FIG. 1 is a conceptual diagram showing the outline of the construction of an embodiment of an inner drum type light beam scanning apparatus according to the sixth aspect of the present invention.

FIG. 1 is a conceptual diagram showing the outline of the construction of an embodiment of the cylindrical internal surface scanning type light beam scanning apparatus (hereinafter referred to as the "inner drum type light scanning apparatus) according to the sixth aspect of the present invention that carries out the cylindrical internal surface scanning type light beam scanning method according to the second aspect of the present invention. Note that, needless to say, the cylindrical internal surface scanning type light beam scanning apparatus according to the sixth aspect of the present invention is an embodiment of the light beam scanning apparatus according to the fifth aspect of the present invention that carries out the light beam scanning method according to the first aspect of the present invention.

In FIG. 1, an inner drum type light scanning apparatus 10 includes three laser diodes 12a, 12b, and 12c functioning as light beam outputting means that output laser beams having approximately the same wavelength and approximately the same intensity. Also, in order to generate parallel light by collimating laser beams outputted from the laser diodes 12a, 12b, and 12c, the inner drum type light scanning apparatus 10 includes first collimator lenses 14a, 14b, and 14c, secondary acoustic optical devices (AODs) 16a, 16b, and 16c functioning as light deflecting devices, AOD emitting lenses 18a, 18b, and 18c, $0^{th}$ order light cut boards 20a, 20b, and 20c, and second collimator lenses 22a, 22b, and 22c. In order to synthesize generated parallel light, the inner drum type light scanning apparatus 10 further includes a synthesizing optical system 24 constructed of a reflection mirror 24a, a deflection beam splitter 24b, and a beam splitter 24c. With this construction, the parallel light is approximately synthesized into a single laser beam.

The inner drum type light scanning apparatus 10 also includes beam expander systems 26 and 28 for increasing the beam diameter of a light beam generated by synthesizing the laser beams into an approximately single laser beam, an opening 30 for removing flare light, a mirror 32 for changing the direction of the light beam, a condensing lens 34 that generates spot light by condensing the light beam, and a light deflector (spinner) 36 that rotationally scans the condensed spot light on a recording sheet 42 that is placed and scanned on an internal surface of a drum 40.

There is also provided a traverse (auxiliary scan conveying system) 44 for moving an optical system, such as the condensing lens 34 and the spinner 36, along the center line of the drum.

It should be noted here that in addition to these construction elements, the inner drum type light scanning apparatus 10 in this embodiment includes a wavefront control device (WFC) 38 that realizes the features of the first to eighth aspects of the present invention and compensates for various factors, and in particular longitudinal displacement of a light beam (defocus), degradation in the condensing spot shape of the light beam due to aberration in an optical system (blurring of the light beam), and lateral displacement of the light beam (error in a condensing spot position) (lateral displacement of the light beam).

The wavefront control device 38 controls the wave front of the light beam and is placed on the upstream side of the light deflector 36 or preferably between the beam expander 28 and the condensing lens 34, although this device will be described in detail later. In particular, in the case of this embodiment, as shown in FIG. 1, the wavefront control device 38 is placed between the mirror 32 and the condensing lens 34.

The wavefront control device 38 controls the wave front of a light beam. In more detail, it is possible to use a deformable mirror that is applied to an astronomical telescope or the like, for instance. In the case where the wave front of light from a star is distorted by a fluctuation of the atmosphere, for instance, this deformable mirror compensates for the distortion in the wave front by reflecting the light with its reflection mirror whose surface shape is deformed.

As the deformable mirror (of reflection mirror type), there are known a face sheet mirror, a bimorph mirror, a divided piston mirror, and the like, for instance.

Also, as the wavefront control device 38, it is possible to use a transmission type that uses a liquid crystal device.

The face sheet mirror is formed by sticking a mirror surface like thin glass on many actuators, thereby enabling the deformation of the mirror surface by independently moving the actuators. As the actuators for deforming the mirror surface, it is possible to use a laminated piezo element, an electrostrictive device (PMN), an electrostatic attractive force type (manufactured by Oko Electric Industry Co., Ltd., for instance), and the like.

The bimorph mirror is constructed by sticking a plurality of piezo boards that have been polarized in opposite directions with reference to each other. By applying a voltage to each piezo board, the curvature of the mirror surface is changed, thereby deforming a mirror surface.

The divided piston mirror divides a mirror surface and independently controls the tilt of each divided mirror surface using a piston.

Also, the transmission type using a liquid crystal device performs wavefront control by controlling an optical path length.

In this embodiment, by providing the wavefront control device 38 on the optical path in this manner, the longitudinal displacement of a light beam, the degradation in the condensing spot shape of the light beam due to aberration in the optical system, and lateral displacement of the light beam are compensated for.

As factors of the degradation in the condensing spot shape due to the longitudinal displacement of a light beam (hereinafter also referred to as the "defocus"), for instance, it is possible to cite an error from the roundness of the drum (eccentricity of the drum, cylindrical error, and the like), an error in the straight line property of the traverse moved for auxiliary scanning, the mismatch between the moving direction of the traverse and the center line of the drum (parallel shifting or crossing), variations in the thickness of a photosensitive medium, and the like.

Figure 2A:
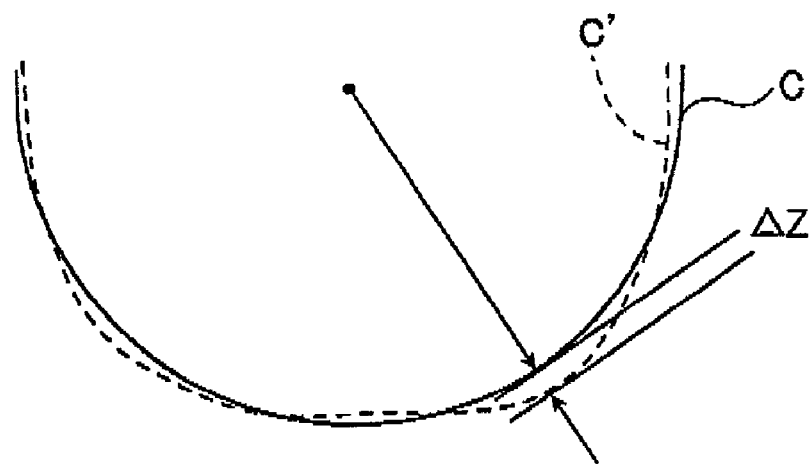
FIG. 2A is an explanatory diagram showing the eccentricity of a drum and FIG. 2B is an explanatory drawing showing a cylindrical error of the drum.

In this embodiment, the drum roundness error means a shift Δz from a perfect circle in the case where the drum does not become a perfect circle C and becomes a distorted circle C', as shown in FIG. 2A. That is, when the spot diameter is adjusted in order to record an image on a drum by assuming that the drum originally becomes the perfect circle C, if the drum is distorted like the circle C', the spot diameter is degraded by the amount corresponding to the shift Δz.

Figure 2B:
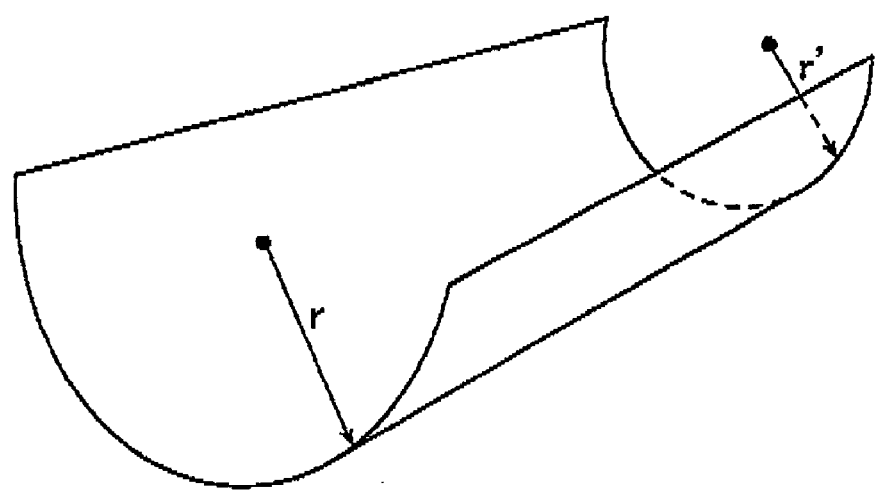

Also, the cylindrical error refers to a difference between the radius of curvatures r and r' depending on the position of the drum, as shown in FIG. 2B. Also, in this case, if image recording is performed in the same manner, the image shape is distorted. Also, the traverse straight line property error means a situation where the traverse 44 is not moved along a straight line and its moving path deviates from the straight line and becomes a curve. Further, the mismatch between the moving direction of the traverse and the center line of the drum means a situation where although the traverse 44 is moved along a straight line, its moving direction deviates from the center line of the drum.

In order to cope with the degradation in the condensing spot shape of the light beam due to the defocus resulting from these factors, power (refracting power (curvature of the wave front); function of the order 2) is given to the light beam operating surface (reflection surface or transmission surface, for instance) of the wavefront control device 38, thereby controlling the power or the distortion of the wave front of the light beam emitted from this wavefront control device 38. As a result, it becomes possible to compensate for this. No specific limitation is imposed on a method of giving power to the wavefront control device 38. For instance, the reflection surface may be deformed by driving the actuator of the wavefront control device 38, thereby changing the refracting power or the curvature. In the case of the transmission type, the refractive index may be changed by changing the internal molecular structure.

In more detail, it is assumed that the focal distance of the condensing lens 34 is f=280 mm, the beam light flux diameter is $\Phi b=30$ mm and the defocus on a recording surface is $\Delta z=100$ μm.

Figure 3:
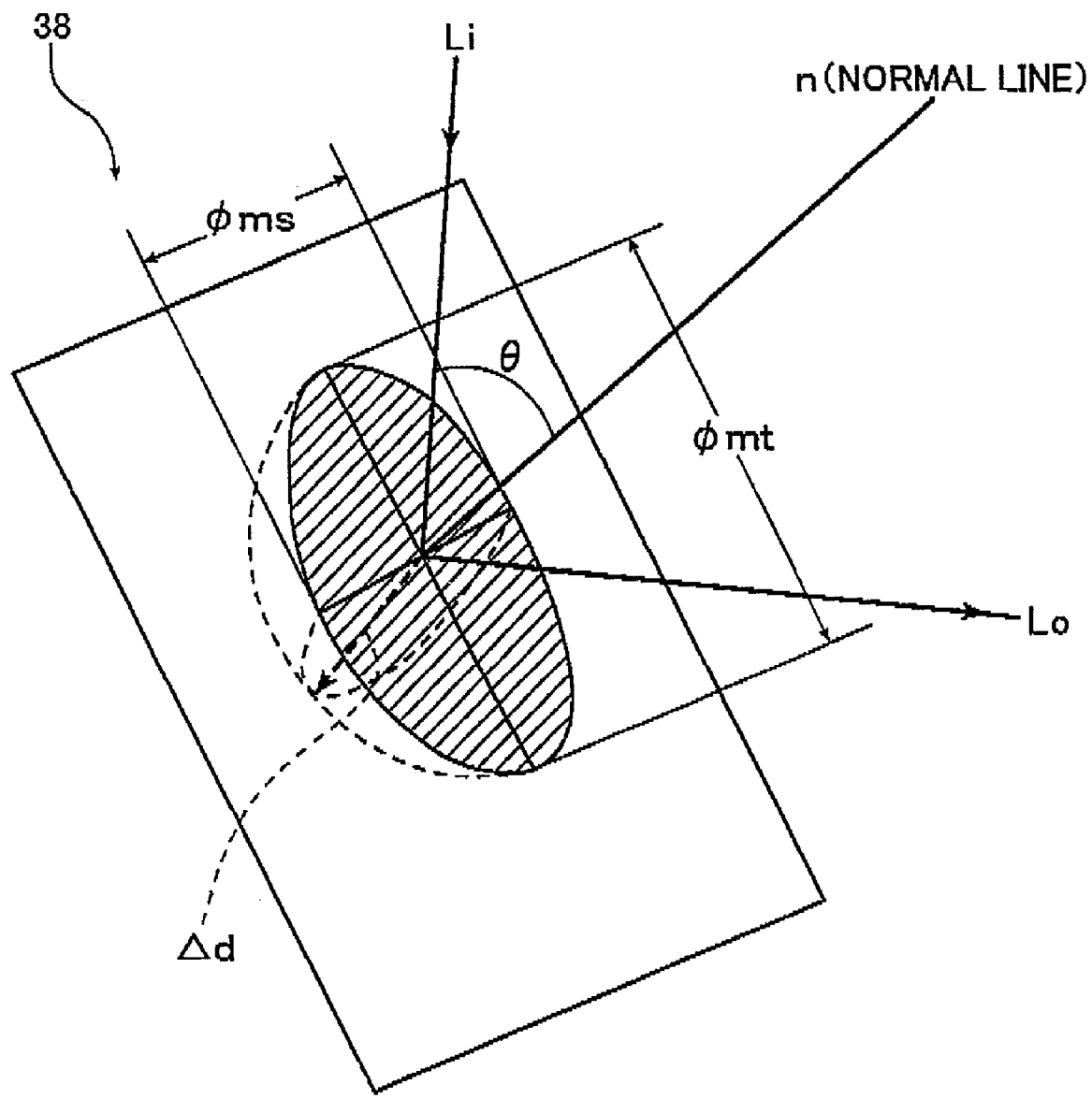
FIG. 3 is an explanatory diagram showing a state where power is given to a wavefront control device.

Also, as indicated by the diagonal lines in FIG. 3, the wavefront control device 38 has an oval shape where the diameter (major axis) in a direction in which a plane formed by incident light Li and reflection light $L_0$ crosses the reflection surface of the wavefront control device 38 is $\Phi mt$ and a diameter (minor axis) in a direction perpendicular to this is $\Phi ms$.

In this case, if the light beam incident angle to the wavefront control device 38 is referred to as θ, it is preferable that $\Phi mt=\Phi ms/\cos θ=\Phi b/\cos θ$.

Also, as indicated by the broken line in FIG. 3, the wavefront control device 38 is deformed to have a shape where sections of the ellipse drawn by the diagonal lines taken in the major axis direction and the minor axis direction are both a part of a circle. In this case, the deformation amount $\Delta d$ of the center portion that is necessary for the compensation for the defocus becomes $\Delta d=0.1$ μm. By deforming the reflection surface of the wavefront control device 38 in this manner, the wave front of the light beam controlled by the wavefront control device 38 is given power, so that it becomes possible to compensate for the defocus described above.

Also, as to the compensation for the degradation in the condensing spot shape due to aberration in the optical system, for instance, in the case of astigmatism where the condensing position of a light beam flux emitted from the off-axis object point in the optical system on a sagittal plane does not coincide with the condensing position on a tangential plane, the compensation is performed by performing control so that vertical and horizontal power amounts of the reflection surface of the wavefront control device 38 are changed.

Also, for instance, in the case of coma aberration that is generated by the distortion of the cross-section shape of the reflection surface of the spinner 36 in a tertiary curved manner due to the rotation of the spinner 36, by giving a distortion (function of the order 3 or higher order) to the operating surface (reflection surface or transmission surface) of the wavefront control device 38 in accordance with its shape, compensation is performed by controlling the power or distortion of the wave front of the light beam emitted from this wavefront control device 38.

Also, as factors of the lateral displacement of the light beam, for instance, there are cited an error from the roundness of the drum (eccentricity of the drum, cylindrical errors, or the like), a straight line property error in the traverse moved for auxiliary scanning, the mismatch between the moving direction of the traverse and the center line of the drum (parallel shifting or crossing), the mismatch between the incident light beam and the drum center line, and the like.

In order to cope with the lateral displacement of the light beam caused by these factors, tilt (inclination; a function of the order 1) is given to the operating surface (reflection surface or transmission surface, for instance) of the wavefront control device 38. By doing so, the tilt (inclination) of the wave front of the light beam emitted from this wavefront control device 38 is controlled by the wavefront control device 38 and therefore compensation is performed.

In more detail, it is assumed that the focal distance of the condensing lens 34 is f=280 mm, the beam light flux diameter is $\Phi b=30$ mm, and the beam positional error on a recording surface is $\Delta x=100$ μm. That is, there exists a shift of 100 μm on the recording sheet 42 in the x direction.

Figure 4:
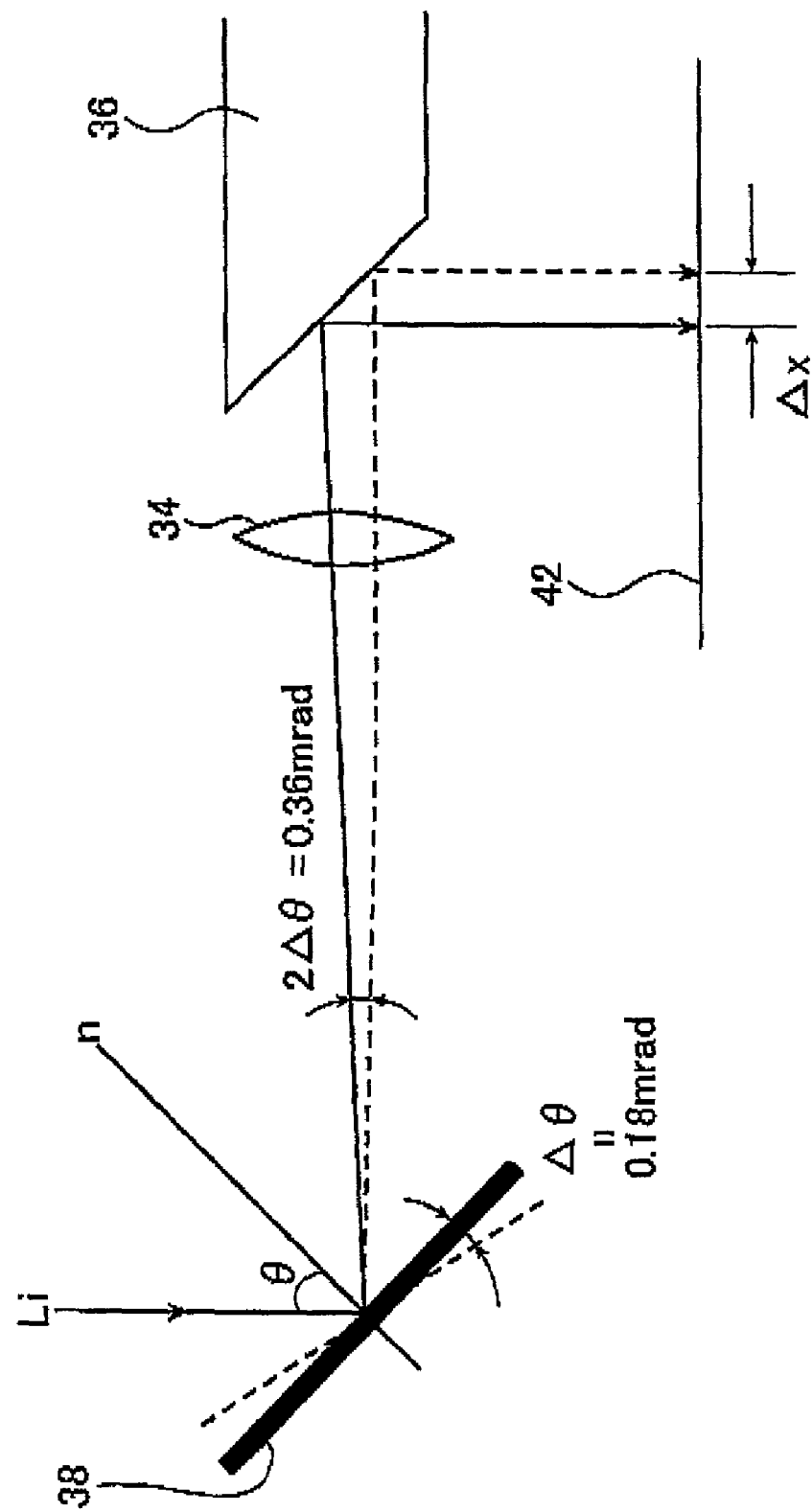
FIG. 4 is an explanatory diagram showing a state where tilt is given to the wavefront control device.

In this case, as shown in FIG. 4, it is required that the direction of the reflection light of the wavefront control device 38 is changed by 0.36 mrad. As a result, the tilt amount (inclination angle) $\Delta θ$ of the wavefront control device 38 that is necessary to compensate for the positional error described above becomes $\Delta θ=0.36/2=0.18$ mrad.

That is, in this case, by tilting the reflection surface (mirror surface) of the wavefront control device 38 by 0.18 mrad, it becomes possible to compensate for the shifting on the recording sheet 42 in the x direction.

It should be noted here that FIG. 4 conceptually shows a state of the compensation and the direction, in which the wavefront control device 38 is tilted, is changed in accordance with the direction of the positional shifting.

In the above-mentioned example, there have been explained compensation methods for each case where there occurs longitudinal displacement of a light beam (defocus), the degradation in the condensing spot shape due to aberration in the optical system, and lateral displacement of a light beam. However, there may be a case where these degradation and error occur at the same time. In such a case, the compensation is performed so that the wave front of light beam controlled by the wavefront control device 38 is given power and is tilted at the same time. By tilting the mirror surface of the wavefront control device 38 while deforming the mirror surface, for instance, it becomes possible to compensate for each of the deformation and error at the same time. As described above, it is also possible to perform the compensation by combining two or three of these compensation operations.

Also, the aforementioned control of the wavefront control device 38 is performed in synchronism with the rotation of the spinner 36. For instance, this is performed by electrically controlling the actuator that controls the reflection surface of the wavefront control device 38.

Also, the error amount of each error described above (longitudinal displacement and lateral displacement) is measured in advance, the measured error amount is held as a table, and the wavefront control device 38 is controlled in accordance with this table. Alternatively, the error amount may be calculated by measuring an output image and the compensation may be performed in accordance with the calculated error amount.

It should be noted here that in the example described above, an error from the roundness of the drum (eccentricity of the drum, cylindrical error, and the like), the straight line property error of the traverse moved for auxiliary scanning, the degradation in the condensing spot shape of a light beam (longitudinal displacement and aberration in the optical system) caused by factors such as the mismatch between the moving direction of the traverse and the center line of the drum (parallel shifting, crossing), or lateral displacement is compensated for by controlling the power or distortion in the wave front of light beam emitted from the wavefront control device 38 or by controlling the tilt (inclination) of the wave front of the light beam using this wavefront control device. However, the distortion in the wave front of a light beam caused by the distortion in the reflection surface of the rotating spinner 36 may also be compensated for in a like manner by controlling the wave front using the wavefront control device 38 described above.

As has been described in detail above, in accordance with this aspect, the longitudinal displacement of a light beam caused by various kinds of error factors, the degradation in the condensing spot shape due to aberration in the optical system, or lateral displacement of the light beam is compensated for using the wavefront control device. As a result, it becomes possible to improve the image quality during image recording and image reading.

Also, it becomes possible to relax the permissible amount concerning each error (displacement or aberration), which suppresses the processing cost and adjusting cost. As a result, it becomes possible to reduce the cost of an apparatus.

Next, a cylindrical external surface scanning type light beam scanning method and apparatus according to the third and seventh aspects of the present invention, to which the light beam scanning method and apparatus according to the first and fifth aspects of the present invention are applied, will be described with reference to FIGS. 5 to 8.

Figure 5:
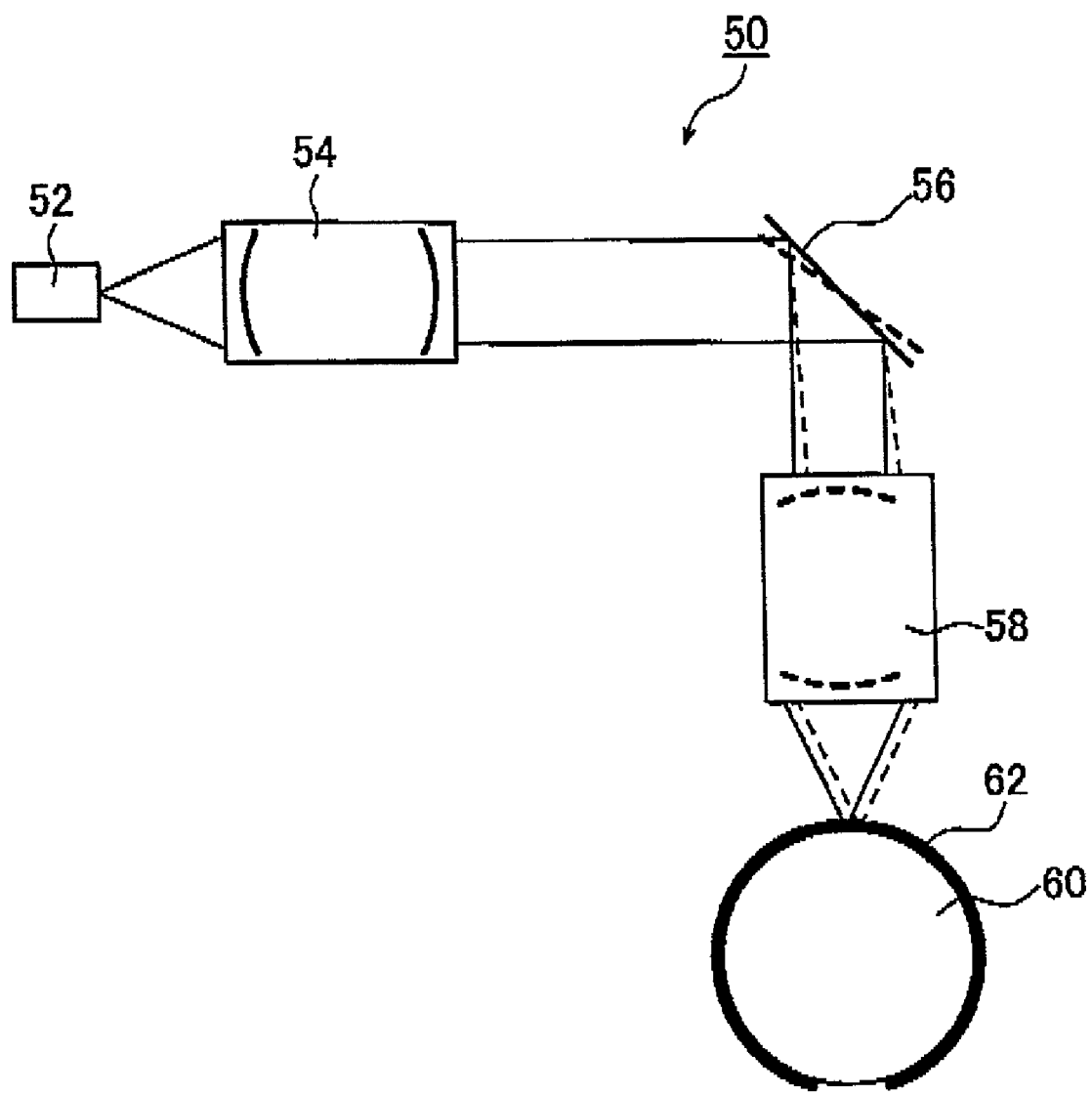
FIG. 5 is a simplified construction diagram showing the first embodiment of an outer drum type light beam scanning apparatus according to the seventh aspect of the present invention.

FIG. 5 is a simplified construction diagram showing the first embodiment of the cylindrical external surface scanning type light beam scanning apparatus (hereinafter referred to as the "outer drum type light scanning apparatus) of the seventh aspect of the present invention that carries out the cylindrical internal surface scanning type light beam scanning method according to the third aspect of the present invention. This first embodiment compensates for lateral displacement of a light beam caused by various kinds of factors by controlling the tilt of the wave front of a light beam emitted from a wavefront control device using this wavefront control device. Note that, needless to say, the cylindrical external surface scanning type light beam scanning apparatus according to the seventh aspect of the present invention is an embodiment of the light beam scanning apparatus according to the fifth aspect of the present invention that carries out the light beam scanning method according to the first aspect of the present invention.

As shown in FIG. 5, the outer drum type light scanning apparatus 50 of this first embodiment is constructed of a light source 52, a first lens group 54, a wavefront control device 56, a second lens group 58, and a recording drum (drum) 60. Also, a recording medium 62 that is a sheet-like object to be scanned is wound around the external peripheral surface of the drum 60.

The outer drum type light scanning apparatus 50 of this embodiment records an image by reflecting a light beam emitted from the light source 52 using the wavefront control device 56 through the first lens group 54 and exposing the recording medium 62 on the drum 60 through the second lens group 58.

As the light source 52, it is possible to use various kinds of light sources corresponding to the spectral sensitivity of a recording medium that is a target so long as they are capable of emitting light having a sufficient light quantity. For example, it is possible to use an ultra-high pressure mercury lamp, a metal halide lamp, and the like in the case where an ordinarily used PS plate (conventional PS plate) that is capable of being exposed by ultraviolet rays is used as the recording medium. It is also possible to use an infrared broad area laser diode or the like in the case where a heat mode plate that is sensitive to infrared light is used as the recording medium. In addition to the above-mentioned light sources, it is possible to use a halogen lamp, a xenon lamp, a two-dimensional array-shaped light source (LED), and the like in accordance with the type of the recording medium.

The first lens group 54 is constructed so as to include a collimator lens and converts light beam emitted from the light source 52 into parallel light. The second lens group 58 is constructed so as to include a condensing lens (focusing lens) and forms an image on the recording medium 62 wound around the external surface of the drum 60 by generating spot light through the reduction of the beam diameter of the light beam.

Also, the wavefront control device 56 controls the wave front of a light beam by changing the tilt (inclination) of its reflection surface (wave front), the power (refracting power), distortion, and the like. In this embodiment, lateral displacement of a light beam is compensated for by controlling the tilt of the wave front of emitted light beam using this wavefront control device 56.

The wavefront control device 56 controls the wave front of a light beam by changing its tilt, power, distortion, and the like. Therefore, it is enough that there is used a wavefront control device that is the same as the wavefront control device 28 used in the aforementioned second and sixth aspects, so that the detailed description thereof will be omitted.

In this embodiment, as described above, the lateral displacement of a light beam due to various kinds of factors is compensated for by providing the wavefront control device 56 that is capable of controlling the wave front of a light beam between the first lens group 54 and the second lens group 58.

As the factors of the lateral displacement of a light beam, as described above, there may be conceived, for instance, the eccentricity or distortion in a drum cylindrical direction caused during the manufacturing of a drum, variations and the like in the thickness of a recording medium, such as a plate or a film, wound around the drum external peripheral surface, the distortion or bending in a rail of an auxiliary scanning mechanism that has the scanning optical system perform the auxiliary scanning, the bending in an exposure surface plate, an error in the auxiliary scanning sending speed due to an error in a lead pitch of an auxiliary scanning ball screw of the auxiliary scanning mechanism, and the like. In addition, figure shifting is also caused by the displacement of a recording beam caused during the spiral exposure using a multi-beam.

In the case where a lateral displacement of a light beam, that is, the shifting of a recording position on a recording surface (shifting on the recording surface in the x and y directions) is caused by these various kinds of factors, this shifting is compensated for using the wavefront control device 56.

In more detail, by tilting (inclining) the light beam operating surface (mirror surface in the illustrated example) of the wavefront control device 56, the lateral displacement of a light beam is compensated for.

For instance, by tilting (inclining) the wavefront control device 56 existing at the position specified by the solid line in FIG. 5 until the position specified by the broken line, compensation is performed so that a light beam condensed on the recording medium 62 is displaced from the position specified by the solid line to the position specified by the broken line.

During this operation, as to the relation between the amount of the lateral displacement on the recording surface and the amount of the tilt (inclination angle) of the wavefront control device 56, recording is actually performed on a recording medium in advance, the amount of a displacement that occurs during the recording is measured, a tilt amount corresponding to this displacement amount is calculated, and the calculated tilt amount is given to the driver of the wavefront control device 56.

As a result, by controlling the wavefront control device 56 through the driving of the driver for the wavefront control device 56 so that the various lateral displacement amounts existing within the recording surface is synchronized with the tilt amount, it becomes possible to compensate for the lateral displacement due to various kinds of factors.

As described above, in accordance with this embodiment, in an outer drum type light scanning apparatus, it becomes possible to compensate for lateral displacement of a light beam caused by various factors, which makes it possible to ensure stabilized image quality of an exposing apparatus itself.

Also, there is not required high processing accuracy for a drum that would become a factor causing the lateral displacement of a light beam, so that it becomes possible to reduce the processing accuracy of the drum and other various kinds of construction elements. As a result, it becomes possible to further reduce the price of an apparatus. That is, through the application of the present invention, it becomes possible to easily compensate for lateral displacement of a light beam with an apparatus, whose price is further reduced, and to obtain a high-quality image.

Next, there will be described a second embodiment of the seventh aspect of the present invention.

In this embodiment, the light beam scanning apparatus of the present invention is applied to the same outer drum type light scanning apparatus (exposing apparatus) as in the first embodiment described above. Longitudinal displacement of a light beam caused by various kinds of factors is compensated for by controlling the power of the wave front of a light beam emitted from a wavefront control device using this wavefront control device.

Figure 6:
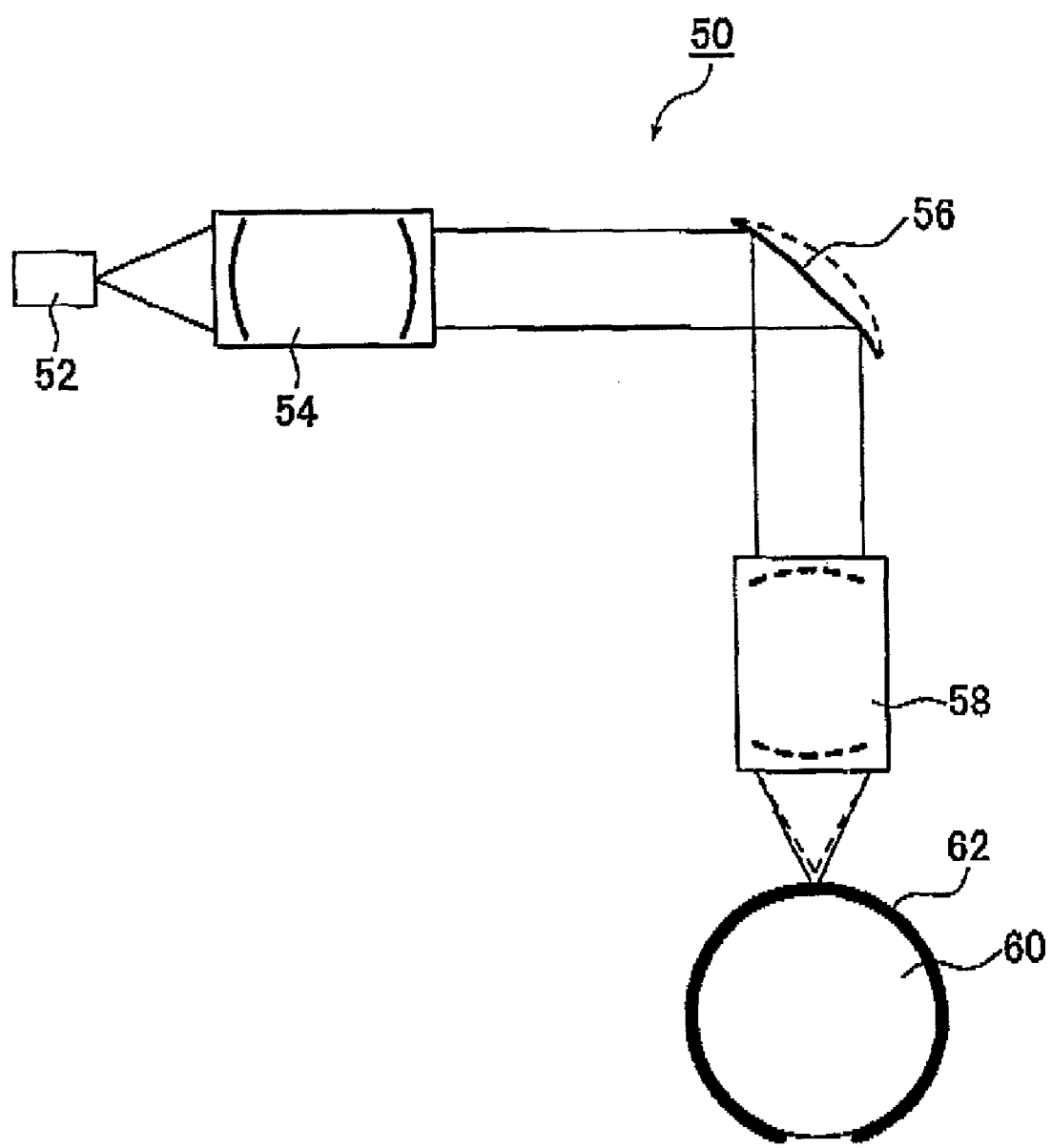
FIG. 6 is a simplified construction diagram showing the second embodiment of the outer drum type light beam scanning apparatus according to the seventh aspect of the present invention.

An outer drum type light scanning apparatus 50 of this embodiment is shown in FIG. 6. However, this apparatus is the same as that in the aforementioned first embodiment shown in FIG. 5, so that the detailed description of the construction of this apparatus will be omitted.

The difference between this embodiment and the aforementioned first embodiment is a method of controlling the wavefront control device 56. That is, in this embodiment, the longitudinal displacement of a light beam is compensated for by giving power (refracting power) to the wavefront control device 56.

As described above, as the factors of the longitudinal displacement of a light beam, there may be conceived, for instance, eccentricity and distortion in the drum cylindrical direction caused during the manufacturing of a drum, the floating of an aluminum plate from the external surface of the drum due to the centrifugal force during the rotation of the drum in the case of the CTP or the like, the floating of a recording medium due to the existence of minute dust between a recording medium wound around the drum external surface and the drum external surface, the distortion and bending in a rail of an auxiliary scanning mechanism, and the like.

When a longitudinal displacement of a light beam, that is, a shift ($\Delta z$) in the optical axis direction (z direction perpendicular to the x and y directions on the recording surface) is caused by these various kinds of factors, this longitudinal displacement or shift is compensated for by the wavefront control device 56.

The power of the wave front of a light beam emitted from the wavefront control device 56 is controlled by controlling the power (curvature, for instance) of the wave front of this device, thereby compensating for the longitudinal displacement of a light beam. During this operation, no specific limitation is imposed on a method of controlling the power of the wave front using the wavefront control device 56. For instance, the wavefront control device 56 that first has a plane shape shown in FIG. 6 using the solid line is changed to have a curve shape shown in FIG. 6 using the broken line by controlling the wavefront control device 56 using an unillustrated wavefront control device driver, thereby changing the refractive index. Alternatively, like in the case where the wavefront control device 56 is of the liquid crystal type, the refractive index may be changed by changing the internal molecular arrangement without changing its shape.

As described above, longitudinal displacement caused by various factors in the outer drum type light scanning apparatus is compensated for by using the wavefront control device, so that it becomes possible to ensure stabilized image quality of the light scanning apparatus (exposing apparatus) itself. Also, there is not required high processing accuracy for the drum and other various construction elements, so that it becomes possible to realize an apparatus whose price is further reduced.

Further, there is not performed the mechanical moving of a heavy-weighted lens and the like, it becomes possible to suppress redundant vibrations and also to reduce a driving current.

It should be noted here that when longitudinal displacement of a light beam is compensated for using the wavefront control device 56, it is enough that data concerning the detection of the longitudinal displacement of a light beam is obtained by performing the scanning of a recording medium in advance and the wavefront control device 56 is controlled based on the data. In particular, in the case where the displacement or shift is caused by a factor inherent in a system such as the eccentricity of a drum or the bending of a rail of an auxiliary scanning mechanism, a method, with which data is obtained in advance in this manner, this data is inputted into the wavefront control device driver, and control is performed using this driver, is effective.

Also, in the case of a factor such as the floating of a recording medium due to the existence of dust or the like, the place, in which the longitudinal displacement is caused, is changed each time the displacement is caused. In this case, however, it is enough that the compensation is performed in a real-time manner by performing detection using a sensor and performing feedback with a method to be described later.

Next, there will be described a third embodiment of the seventh aspect of the present invention.

In the third embodiment, as to the wavefront control device 56 provided between the first lens group 54 and the second lens group 58 in the first embodiment or the second embodiment described above, the arrangement of the wavefront control device 56 and the second lens group 58 is changed to more preferable arrangement, thereby compensating for longitudinal displacement of a light beam only by moving a focal position while hardly changing a beam diameter.

Figure 7:
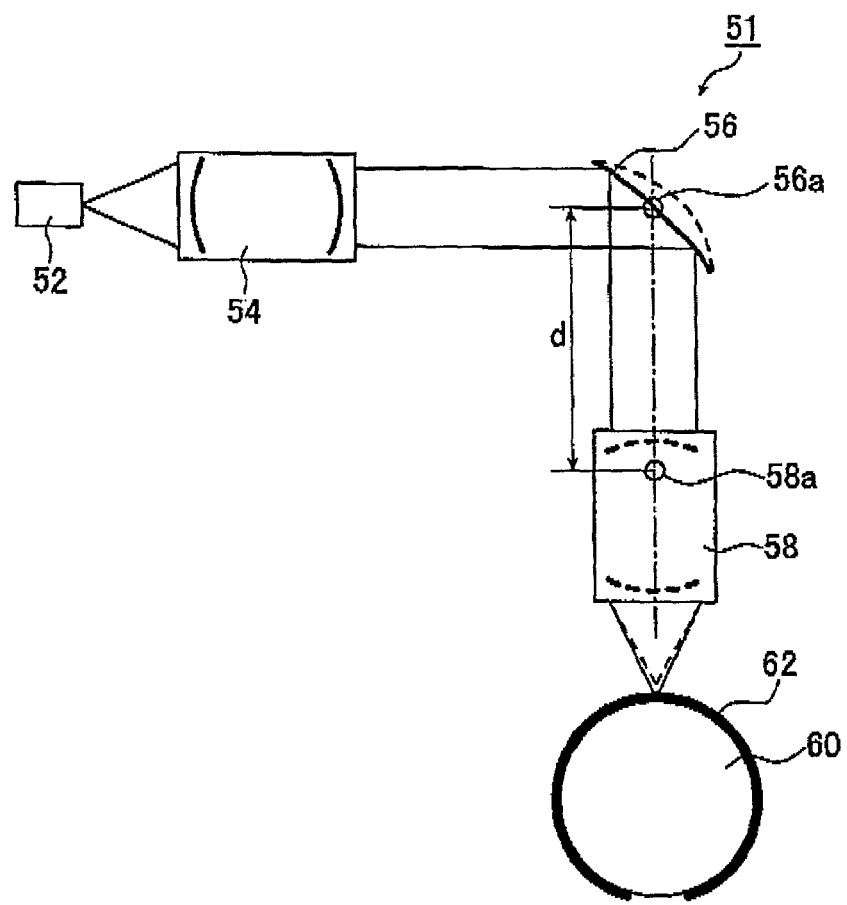
FIG. 7 is a simplified construction diagram showing the third embodiment of the outer drum type light beam scanning apparatus according to the seventh aspect of the present invention.

That is, as shown in FIG. 7, the outer drum type light scanning apparatus 51 of this third embodiment has the same construction as in the first or second embodiment and includes a light source 52, a first lens group 54, a second lens group 58, a recording drum 60, and a wavefront control device 56 provided between the first lens group 54 and the second lens group 58. However, as will be described below, some thought is put so that the wavefront control device 56 and the second lens group 58 are suitably arranged.

As described above, the wavefront control device 56 is a variable focus system that is capable of changing its refractive index (curvature of its operating surface) by changing power, thereby changing its focal distance. On the other hand, the second lens group 58 has a fixed focal distance, which means that this second lens group 58 is a fixed focus system.

Under this condition, a distance between a rear-side principal point 56a of the wavefront control device 56 that is the variable focus system and a front-side principal point 58a of the second lens group 58 that is the fixed focus system is referred to as "d". Also, the front-side focal distance of the second lens group 58 is referred to as "f".

Here, the wavefront control device 56 and the second lens group 58 are arranged so that the distance "d" between respective principal points described above becomes equal to the front-side focal distance f of the second lens group 58, that is, there is obtained a condition of "d=f".

That is, the wavefront control device 56 and the second lens group 58 are arranged so that the rear-side principal point 56a of the wavefront control device 56 that is the variable focus system coincides with the front-side focus position of the second lens group 58.

By arranging the wavefront control device 56 and the second lens group 58 in this manner, it becomes possible to move only the focus position of a light beam condensed on the recording medium 62 by the second lens group 58 while hardly changing the beam diameter of the light beam.

Accordingly, it becomes possible to obtain a more superior effect with the construction of the first or second embodiment described above and particularly with the arrangement in this third embodiment.

Next, there will be described a fourth embodiment of the seventh aspect of the present invention.

In this fourth embodiment, a sensor is provided, the distance between a scanning optical system and a recording surface is measured, factors of longitudinal displacement such as the floating of a recording medium due to dust or the like is detected, and the wavefront control device is controlled in accordance with the detection result, thereby compensating for the longitudinal displacement in a real-time manner and realizing auto-focusing by feeding back the detection result of the sensor.

Figure 8:
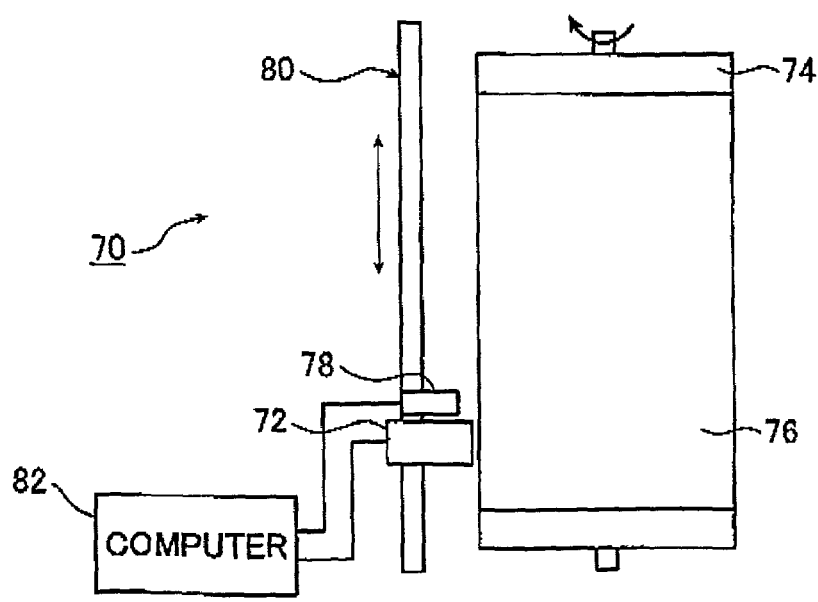
FIG. 8 is a plan view showing the simplified construction of the fourth embodiment of the outer drum type light beam scanning apparatus according to the seventh aspect of the present invention.

FIG. 8 is a plane view showing the outline of the outer drum type light scanning apparatus of this embodiment.

As shown in FIG. 8, an outer drum type light scanning apparatus 70 of this embodiment scans a recording medium 76 wound around a recording drum 74 using an exposing head 72 on which there are mounted an optical system such as the wavefront control device and the like. A recording surface distance sensor 78 that measures a distance from the exposing head 72 to the recording surface of the recording medium 76 is provided in the proximity of the exposing head 72. The exposing head 72 and the recording surface distance sensor 78 are both moved by an auxiliary scanning moving mechanism (not shown) on an auxiliary scanning rail 80 in a direction parallel to the rotation axis of the recording drum 74 as indicated by the arrow in the drawing.

Also, a measurement signal of the recording surface distance sensor 78 is inputted into a computer (control means) 82 and this computer 82 controls the wavefront control device based on the inputted measurement signal. Note that the computer 82 performs the overall control of the apparatus, such as the control of the rotation of the drum, the auxiliary scanning moving mechanism, and image data as well as the wavefront control device.

The exposing head 72 receives a light beam emitted from an unillustrated light source and performs exposure by condensing this light beam on the recording surface. In addition, the exposing head 72 is moved on the auxiliary scanning rail 80. By doing so, an image is exposed on the recording surface in a two-dimensional manner. Note that as the exposing head 72, it is possible to use an optical system including the wavefront control device 56 of the outer drum type light scanning apparatuses 50 and 51 shown in FIGS. 5 to 7 by mounting this optical system on an optical surface plate or the like.

The recording surface distance sensor 78 measures a distance to the recording surface at a position where the recording surface distance sensor 78 somewhat precedes at least a position, at which the exposing head 72 performs exposure, in the auxiliary scanning direction. The measurement result is sent to the computer 82 and this computer 82 analyzes the result.

In the case where there is detected a situation where the measured distance assumes a value that is different from a fixed value (such as a situation where although almost the same values are continuously sent, there is sent a value that is smaller than the preceding values), the computer 82 judges that the recording surface is floated due to some factor. Therefore, when the exposing head 72 exposes a corresponding position, the computer 82 controls the wavefront control device in synchronism with the exposure, thereby correcting the focal position. Also, even in the case where the diameter of the recording drum 76 varies depending on the position, for instance, this situation is detected using the measurement signal and the wavefront control device is controlled accordingly, thereby allowing a focal position to be fixed on the recording surface at all times.

By feeding back the measurement value of the sensor and controlling the wavefront control device based on this measurement value in this manner, it becomes possible to easily compensate for the generation of longitudinal displacement due to sporadic factors, such as dust, as well as factors ascribable to the apparatus itself. Also, by compensating for longitudinal displacement at high speed in this manner, it becomes possible to eliminate the effects of dust and the like and to ensure the stability of image quality.

In this manner, it becomes possible to realize complete auto-focusing.

It should be noted here that each embodiment described above of this aspect has been described by taking a light beam recording apparatus (image exposing apparatus), which exposes a sheet-like recording medium that is a sheet-like object to be scanned using a light beam, as an example of the light beam scanning apparatus. However, it is possible to apply the present invention to a light beam reading apparatus (image reading apparatus) that performs the reading of an image or the like from an image bearing medium that is a sheet-like object to be scanned using a light beam such as a laser beam.

Also, the compensation for the lateral displacement and longitudinal displacement of a recording light beam in each embodiment described above may be carried out independently of each other. However, these two compensation operations may be performed at the same time, thereby compensating for the lateral displacement and longitudinal displacement of the recording light beam at the same time. That is, in this case, it is enough that power is given to the wave front of the wavefront control device and to simultaneously tilt the wave front.

Further, in this aspect, like in the second and sixth aspects of the present invention, aberration in the optical system may be compensated for by giving power and distortion to the wave front of the wavefront control device. Also, longitudinal displacement of the light beam as well as the aberration in the optical system may be compensated for in this manner. Further, lateral displacement of the light beam as well as the aberration in the optical system and the longitudinal displacement of the light beam may be compensated for by tilting the wave front of the wavefront control device.

Next, a light beam scanning method and apparatus of the fourth and eighth aspects of the present invention, to which the light beam scanning method and apparatus according to the first and fifth aspects of the present invention is applied, will be described with reference to FIGS. 9 to 12.

First, there will be described the first embodiment of the light beam scanning apparatus of the eighth aspect of the present invention that carries out the light beam scanning method according to the fourth aspect of the present invention. In this first embodiment, the light beam scanning apparatus of the eighth aspect of the present invention is applied to an outer drum type exposing apparatus. By controlling the tilt (inclination) of the wave front of a light beam emitted from a wavefront control device, there is compensated for lateral displacement of the light beam caused by the changing of the environmental temperature. Note that, needless to say, the light beam scanning apparatus of the eighth aspect of the present invention is an embodiment of the light beam scanning apparatus of the fifth aspect of the present invention that carries out the light beam scanning method of the first aspect of the present invention.

Figure 9:
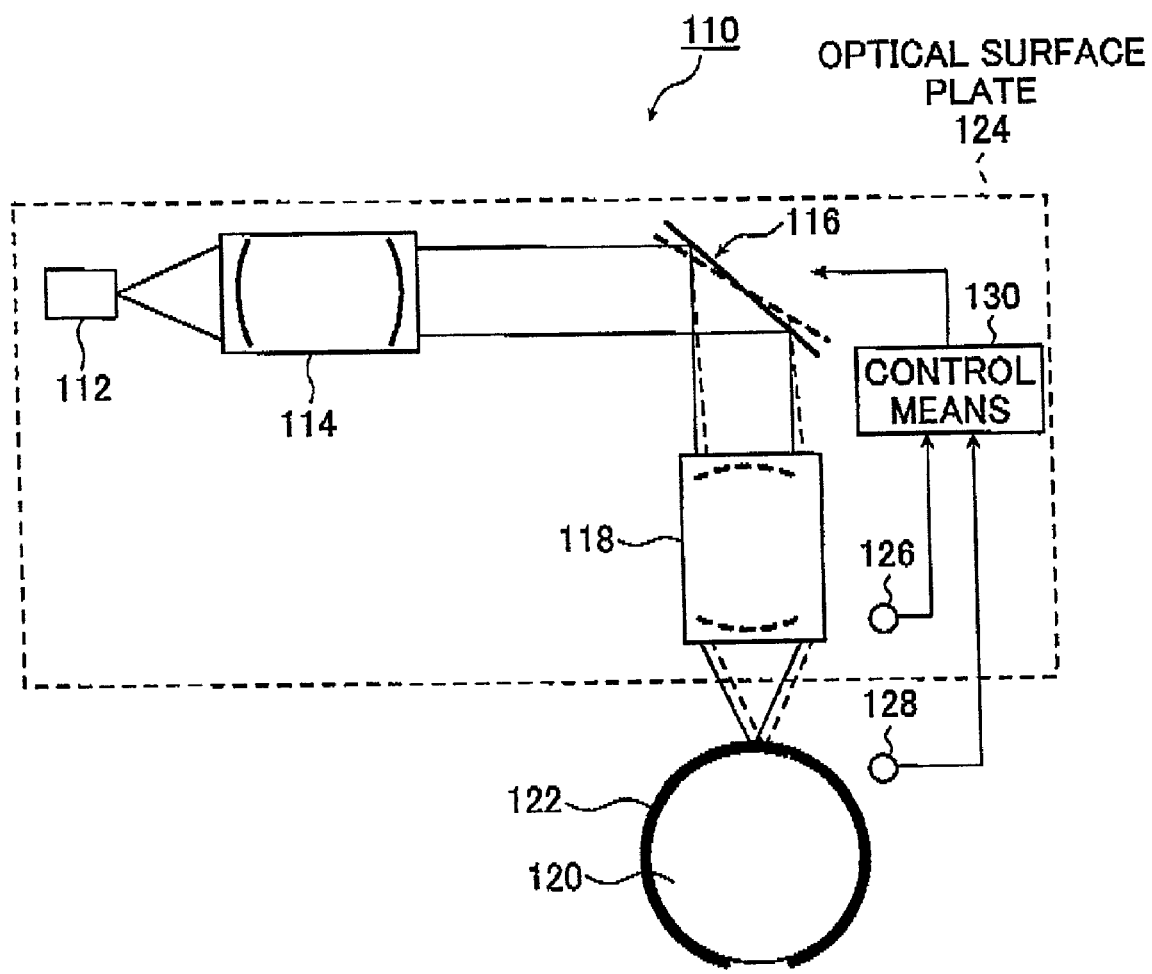
FIG. 9 is a construction diagram showing the outline of an outer drum type exposing apparatus that is the first embodiment of a light beam scanning apparatus according to the eighth aspect of the present invention.

FIG. 9 is a construction diagram showing the outline of the outer drum type exposing apparatus that is the first embodiment of the light beam scanning apparatus according to the eighth aspect of the present invention.

As shown in FIG. 9, an outer drum type exposing apparatus 110 of this embodiment is constructed of a light source 112, a first lens group 114, a wavefront control device 116, a second lens group 118, and a recording drum (drum) 120. Also, a recording medium 122 that is a sheet-like object to be scanned is wound around the external peripheral surface of the drum 120.

Also, the light source 112, the first lens group 114, the wavefront control device 116, and the second lens group 118 are installed on an optical surface plate 124 and there is obtained a construction where the entire or a part of the optical system including these construction elements is moved for auxiliary scanning in the rotation axis direction of the drum 120 by an unillustrated auxiliary scanning conveying mechanism.

Further, temperature sensors 126 and 128 for measuring the environmental temperature of the apparatus that are one feature of the present invention are respectively installed on the optical surface plate 124 and in the proximity of the recording medium 122 for which exposure is actually performed. The detection signal (temperature measurement signal) of each of the temperature sensors 126 and 128 is inputted into a control means (driver) for controlling the wavefront control device 116. This control means 130 controls the wavefront control device 116 based on the detected environmental temperature.

The outer drum type exposing apparatus 110 of this embodiment is constructed in this manner. When a light beam emitted from the light source 112 is reflected by the wavefront control device 116 through the first lens group 114 and exposes the recording medium 122 wound around the external peripheral surface of the drum 120 through the second lens group 118, beam displacement (lateral displacement) of a recording beam on the surface of the recording medium caused by various kinds of factors in accordance with the changing of the environmental temperature is compensated for by controlling the wavefront control device 116 based on the measured environmental temperature.

As the light source 112, it is possible to use various kinds of light sources corresponding to the spectral sensitivity of a recording medium that is a target so long as they are capable of emitting light having a sufficient light quantity. It is enough that there is used a light source that is the same as the light source 52 used in the seventh aspect described above, so that the detailed description thereof will be omitted.

The first lens group 114 is constructed so as to include a collimator lens and converts a light beam emitted from the light source 112 into parallel light. The second lens group 118 is constructed so as to include a condensing lens (focusing lens) and forms an image on the recording medium 122 wound around the external surface of the drum 120 by generating spot light through the reduction of the beam diameter of the light beam.

Also, the wavefront control device 116 controls the wave front of light beam. In this embodiment, lateral displacement of a light beam on a recording surface caused by various factors in accordance with the changing of the environmental temperature is compensated for using this wavefront control device 116. In more detail, the lateral displacement is compensated for by giving tilt (inclination) to the wavefront control device 116.

The wavefront control device 116 controls the wave front of a light beam by changing power (refracting power). It is enough that there is used a wavefront control device that is the same as the wavefront control devices 28 and 56 that are respectively used in the second, third, sixth, and seventh aspects described above, so that the detailed description thereof will be omitted.

An operation of this embodiment will be described below.

First, prior to the actual exposure, some recording media 122 are exposed and the environmental temperature is measured, thereby obtaining a relation between the environmental temperature and lateral displacement of a recording beam. Then, there is obtained a control amount (tilt amount or inclination angle) showing how much the wavefront control device 116 should be tilted with reference to the measured temperature and a table is prepared from this control amount. The table showing the relation between the environmental temperature and the control amount for the wavefront control device is set in a control means (driver) 130 of the wavefront control device 116.

The light beam emitted from the light source 122 is converted into collimated light by the first lens group 114, reflected by the wavefront control device 116, is condensed by the second lens group 118, and is imaged on the recording medium 122 placed on the external peripheral surface of the drum 120.

During this operation, by continuing the exposure, the environmental temperature of the apparatus changes. Therefore, lateral displacement of the recording beam occurs due to various factors such as the expansion of the drum diameter or other construction elements, for instance.

In view of this problem, in this embodiment, as described above, the temperature sensors for measuring the environmental temperature are provided, thereby measuring the environmental temperature. No specific limitation is imposed on the number of temperature sensors to be installed and the installation places thereof. In the example shown in FIG. 9, two temperature sensors 126 and 128 are installed. One temperature sensor 126 is installed at a predetermined position on the optical surface plate 124 (in the proximity of the second lens group 118, for instance) and the other temperature sensor 128 is installed in the proximity of the recording medium 122 at which exposure is actually performed.

The temperature measurement signals from these two temperature sensors 126 and 128 are fed back to the control means 130 of the wavefront control device 116 at all times. The control means 130 refers to the pre-installed table showing the relation between the environmental temperature and the control amount for the wavefront control device and controls the wavefront control device 116 based on the measured temperature value.

That is, by tilting the wavefront control device 116 as indicated by the solid line and the broken line in FIG. 9, the beam position on the recording medium surface is controlled, thereby compensating for lateral displacement of a recording beam.

During this operation, in the case where there are installed a plurality of temperature sensors, no specific limitation is imposed on the handling of the plurality of measurement values. For instance, there may be obtained an average of the respective measurement values. Alternatively, the measurement value of a temperature sensor installed at a portion that receives the strongest effect of the temperature is regarded as a main temperature value and other measurement values are incorporated into this main temperature value.

By performing control in this manner where the measured environmental temperatures are fed back to the control means 130 of the wavefront control device 116 and the wavefront control device 116 is tilted in accordance with the environmental temperatures, it becomes possible to effectively compensate for lateral displacement of a recording beam caused by various kinds of factors in accordance with the environmental temperature.

Also, as to the method of giving the tilt to the wavefront control device 116 during this operation, the inclination of the plane-shaped reflection surface of the wavefront control device 116 indicated by the solid line in FIG. 9 may be actually changed as indicated by the broken line. Alternatively, only by changing the internal structure of the wavefront control device 116 without changing the external shape thereof, there may be given the same effect as in the case of the tilt.

It should be noted here that when the wavefront control device 116 is controlled based on the fed-back environmental temperature, it is important that a precise table showing the relation between the environmental temperature and the control amount for the wavefront control device 116 is created in advance using sufficient data.

However, if a sufficient calculation speed is ensured, without using such a table, the control may be performed by calculating a control amount that is optimum to the fed-back environmental temperature as occasion demands.

As described above, according to this embodiment, the environmental temperature is measured and the wavefront control device is controlled based on the measured environmental temperature. As a result, it becomes possible to compensate for lateral displacement of a recording beam caused by various factors in accordance with the changing of the temperature of the exposing apparatus and to ensure the stabilized image quality of the exposing apparatus itself.

Also, it is possible to sufficiently compensate for lateral displacement even if the processing accuracy concerning the drum and other construction elements is not so high, which makes it possible to reduce the processing accuracy concerning these various construction elements. As a result, it becomes possible to further reduce the price of the apparatus.

Next, there will be described a light beam scanning apparatus of the second embodiment of the eighth aspect of the present invention.

In this second embodiment, the light beam scanning apparatus of the eighth aspect of the present invention is applied to the same outer drum type exposing apparatus as in the first embodiment described above. Also, longitudinal displacement of a light beam emitted from a wavefront control element in accordance with the changing of the environmental temperature is compensated for by controlling the power of the wave front of the light beam.

Figure 10:
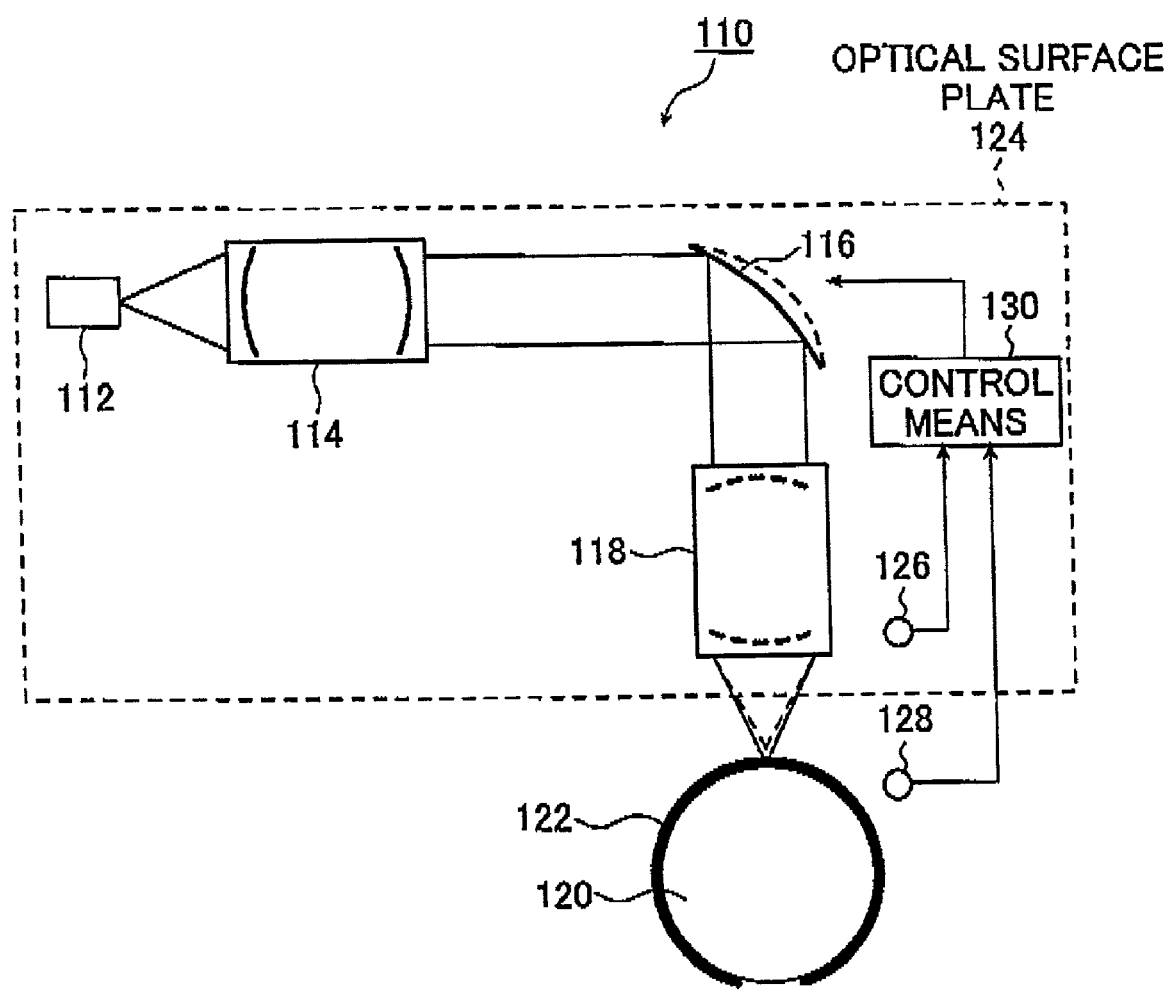
FIG. 10 is a construction diagram showing the outline of an outer drum type exposing apparatus that is the second embodiment of the light beam scanning apparatus according to the eighth aspect of the present invention.

An outer drum type exposing apparatus 110 shown in FIG. 10 that is the second embodiment of the light beam scanning apparatus according to the eighth aspect of the present invention is the same as that in the aforementioned first embodiment shown in FIG. 9 and therefore the detailed description of the construction of this apparatus will be omitted.

The difference between this embodiment and the first embodiment described above is the method of controlling the wavefront control device 116. That is, in this embodiment, power (reflecting power) is given to the wavefront control device 116, thereby compensating for longitudinal displacement of a recording beam. No specific limitation is imposed on the method of giving power to the wavefront control device 116. For instance, the refracting power or curvature may be changed by deforming a reflection surface by driving an actuator of the wavefront control device 116. In the case of the transmission type, a refractive index may be changed by changing the internal molecular structure.

An operation of this embodiment will be described below.

First, in the same manner as in the first embodiment, prior to the actual exposure, some recording media 122 are exposed and the environmental temperature is measured, thereby obtaining a relation between the environmental temperature and longitudinal displacement of a recording beam. Then, there is obtained a control amount showing how much power the wavefront control device 116 should be given with reference to the measured temperature and a table is prepared from this control amount. The table showing the relation between the environmental temperature and the control amount for the wavefront control device is set in a control means (driver) 130 of the wavefront control device 116.

The light beam emitted from the light source 112 is converted into collimated light by the first lens group 114, reflected by the wavefront control device 116, is condensed by the second lens group 118, and is imaged on the recording medium 122 placed on the external peripheral surface of the drum 120.

During this operation, by continuing the exposure, the environmental temperature of the apparatus changes. Therefore, longitudinal displacement of the recording beam occurs due to various factors such as the expansion of the drum diameter or other construction elements, for instance.

The environmental temperature is measured by temperature sensors 126 and 128. The temperature measurement signals from these two temperature sensors 126 and 128 are fed back to the control means 130 of the wavefront control device 116 at all times. The control means 130 refers to the pre-installed table showing the relation between the environmental temperature and the control amount for the wavefront control device and controls the wavefront control device 116 based on the measured temperature value. The power of the wave front of a light beam emitted from the wavefront control device 116 is controlled, thereby compensating for the longitudinal displacement of a recording beam.

By performing control in this manner where the measured environmental temperatures are fed back to the control means 130 of the wavefront control device 116 and the wavefront control device 116 is given power in accordance with the environmental temperatures, it becomes possible to effectively compensate for longitudinal displacement of a recording beam caused by various kinds of factors in accordance with the environmental temperature.

It should be noted that, in the same manner as in the above-mentioned first embodiment, if a sufficient calculation speed is ensured, without using the table, the control may be performed by calculating a control amount that is optimum to the fed-back environmental temperature as occasion demands.

As described above, according to this embodiment, the environmental temperature is measured and the wavefront control device is controlled based on the measured environmental temperature. As a result, it becomes possible to compensate for longitudinal displacement of a recording beam caused by various factors in accordance with the changing of the temperature of the exposing apparatus and to ensure the stabilized image quality of the exposing apparatus itself.

Also, it is not required to select the glass material for the lens unlike in the conventional cases so that no limitation is imposed on the lens glass material, which avoids a situation where the beam quality is degraded. Further, there is not performed the mechanical moving of a heavy-weighted lens, so that it becomes possible to ensure the stability of the system.

The compensation for recording lateral displacement and the compensation for longitudinal displacement in each embodiment described above may be performed independently of each other, although these two compensation operations may be performed at the same time, thereby compensating for the recording lateral displacement and the longitudinal displacement at the same time. That is, in this case, it is enough that the wave front of the wavefront control device 116 is given power and is tilted.

It should be noted here that this point is the same in each embodiment to be described later, so that these two compensation operations will be described together in the following embodiments.

Next, there will be described a light beam scanning apparatus of a third embodiment of the eighth aspect of the present invention.

In this third embodiment, the light beam scanning apparatus of the eighth aspect of the present invention is applied to an inner drum type exposing apparatus.

Figure 11:
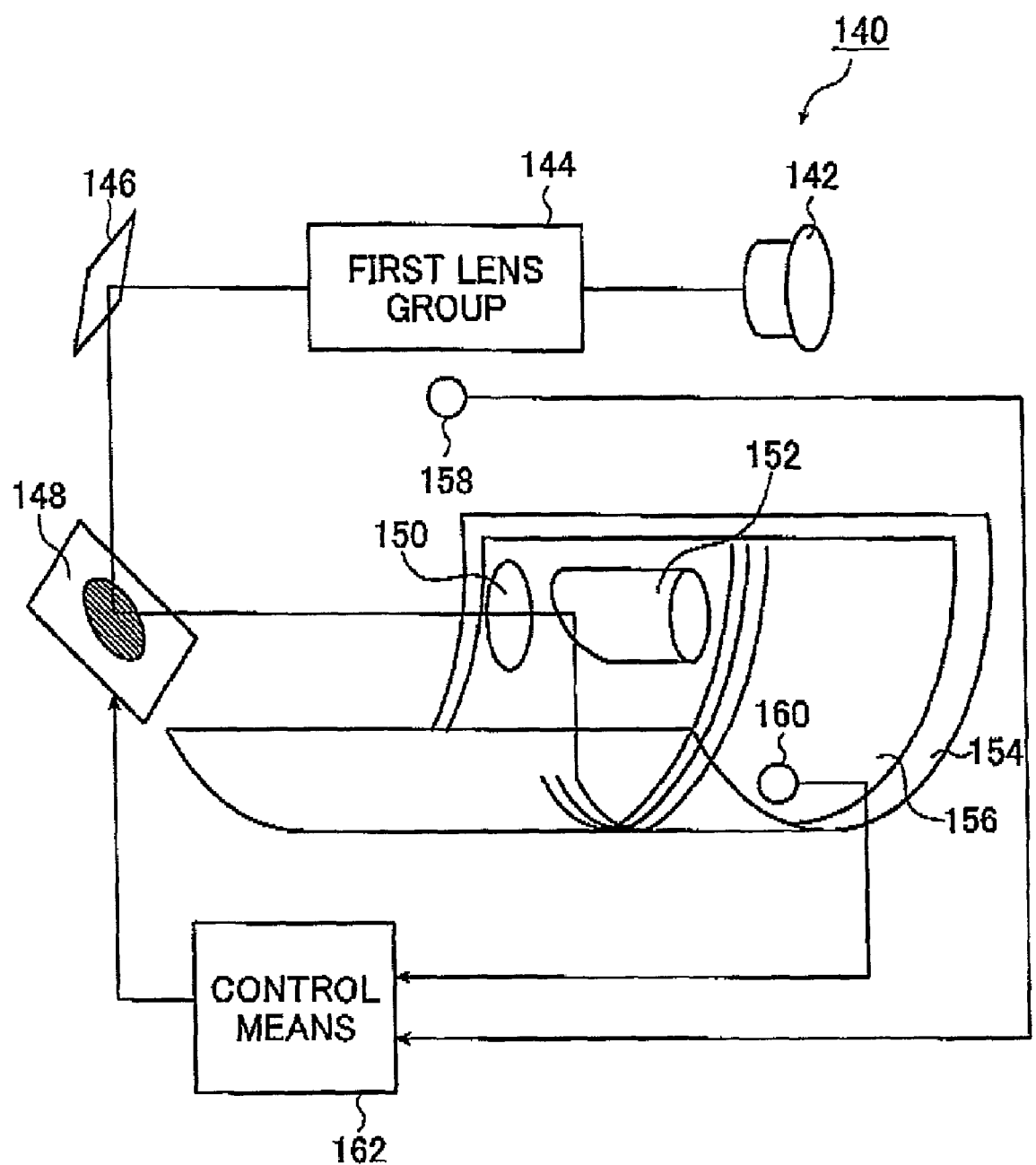
FIG. 11 is a construction diagram showing the outline of an inner drum type exposing apparatus that is the third embodiment of the light beam scanning apparatus according to the eighth aspect of the present invention.

FIG. 11 is a simplified construction diagram of an inner drum type exposing apparatus that is the third embodiment of the light beam scanning apparatus according to the eighth aspect of the present invention.

As shown in FIG. 11, an inner drum type exposing apparatus 140 includes a light source 142, a first lens group 144 that converts a light beam emitted from the light source 142 into collimated light, a mirror 146 that changes the direction of the light, a wavefront control device 148 that controls the wave front of the light beam, a condensing lens 150 that generates spot light by condensing the light beam, and a spinner (light deflector) 152 that rotationally scans the condensed spot light on a recording medium 156 that is a sheet-like object to be scanned placed on the internal peripheral surface of the drum 154.

Also, the inner drum type exposing apparatus 140 includes an unillustrated auxiliary scanning convey system that moves a scanning optical system, such as the condensing lens 150 and the spinner 152, along the center line of the drum 154.

Further, in addition to the above, the inner drum type exposing apparatus 140 in this embodiment includes temperature sensors 158 and 160 that measure the environmental temperature of the apparatus, with the temperature measurement signals of these temperature sensors 158 and 160 being inputted into a control means 162 for controlling the wavefront control device 148.

As to the light source 142, like the light sources 112 of the first and second embodiments described above, it is possible to use various kinds of light sources corresponding to the spectral sensitivity of a recording medium that is a target so long as they are capable of emitting light having a sufficient light quantity. Note that only one light source 142 is shown in FIG. 10, although a plurality of laser diodes that each output a laser beam having approximately the same wavelength and approximately the same strength may be used as the light source 142 and the laser beams outputted from these laser diodes may be synthesized into a single laser beam by a synthesizing optical system, for instance.

Also, the wavefront control device 148 controls the wave front of a light beam by changing power and is the same as the wavefront control devices 116 of the first and second embodiments. Also, as this wavefront control device 148, it is possible to use a so-called deformable mirror that is capable of changing a refractive index by changing the shape of its reflection surface through electrical control.

As to the temperature sensors 158 and 160, like the temperature sensors 126 and 128 in the first and second embodiments, no specific limitation is imposed on the number of temperature sensors and the installation positions thereof. For instance, as shown in FIG. 11, the temperature sensors 158 and 160 may be respectively disposed in the proximity of a scanning optical system and a recording medium.

Also, like the control means 130 in the first and second embodiments, the control means 162 is also given a table showing the relation between the environmental temperature and the control amount for the wavefront control device 148 in advance. With this construction, when temperature measurement signals are inputted from the temperature sensors 158 and 160, the control means 162 refers to the table described above and gives tilt corresponding to the measured environmental temperature to the wavefront control device 148, thereby compensating for lateral displacement of a recording beam. Alternatively, the control means 162 gives power to the wavefront control device 148 by referring to the table described above in a like manner, thereby compensating for longitudinal displacement of the recording beam.

As described above, aside from a point that the outer drum type is replaced with the inner drum type, this third embodiment is the same as the first or second embodiment described above. Like in each embodiment described above, it is possible to precisely compensate for lateral displacement or longitudinal displacement of a recording beam caused by various factors in accordance with the changing of the environmental temperature in the inner drum type exposing apparatus, which makes it possible to ensure the stabilized image quality of the exposing apparatus itself and to obtain the same effects.

Next, there will be described a light beam scanning apparatus of a fourth embodiment of the eighth aspect of the present invention.

In this fourth embodiment, the light beam scanning apparatus of the eighth aspect of the present invention is applied to a flat bed type exposing apparatus.

Figure 12:
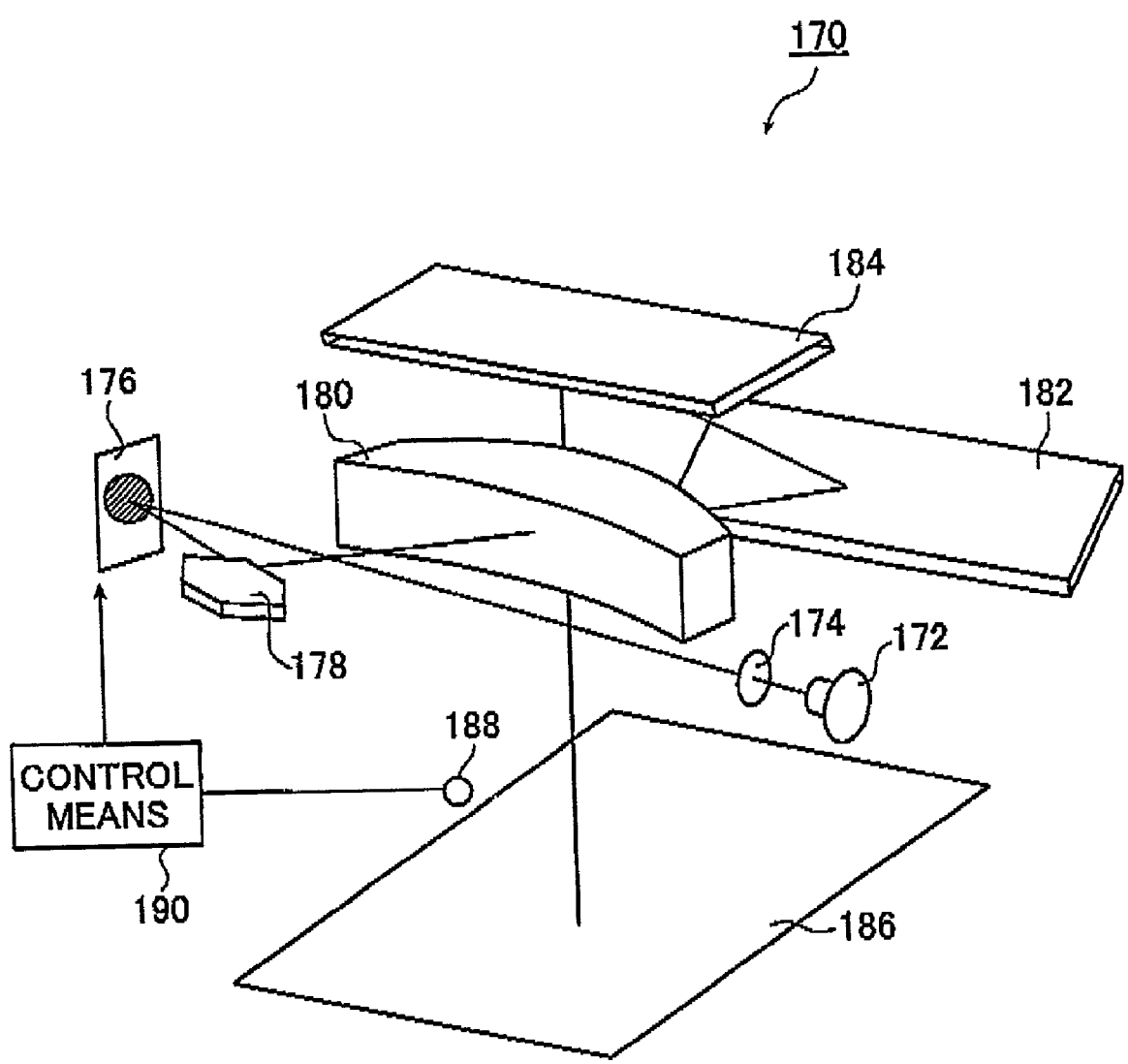
FIG. 12 is a perspective view showing the outline of a flat bed type exposing apparatus that is the fourth embodiment of the light beam scanning apparatus according to the eighth aspect of the present invention.

FIG. 12 is a simplified construction diagram of a flat bed type exposing apparatus that is the fourth embodiment of the light beam scanning apparatus according to the eighth aspect of the present invention.

As shown in FIG. 12, a flat bed type exposing apparatus 170 according to this embodiment converts a laser beam emitted from a light source (laser diode) 172 into parallel light using a collimator lens 174, reflects the parallel light using a wavefront control device 176, deflects the light beam in the main scanning direction using a rotating polygon mirror 178, obtains a predetermined beam diameter using an fθ lens 180, changes the direction of the light beam using long mirrors 182 and 184, and images the light beam on the recording medium 186. During this operation, the scanning optical system and the recording medium are relatively moved in the auxiliary scanning direction, so that the recording medium 186 is exposed in a two-dimensional manner.

It should be noted here that even in this embodiment, a temperature sensor 188 for measuring the environmental temperature of the apparatus is installed at a predetermined place and the measured temperature is fed back to a control means 190 for controlling the wavefront control device 176.

This embodiment is also the same as the first and second embodiments except for a point that the light scanning exposing apparatus is changed from the outer drum type to the flat bed type.

That is, the control means 190 prestores a table showing the relation between the environmental temperature and the control amount for the wavefront control device 176. This control amount is a control amount for giving tilt or power to the wavefront control device 176 in order to compensate for lateral displacement or longitudinal displacement. When the environmental temperature measured by the temperature sensor 188 is inputted during the exposure of the recording medium, the control means 190 refers to the table described above and controls the wavefront control device 176 using a control amount corresponding to the measured environmental temperature, thereby precisely compensating for lateral displacement or longitudinal displacement of a recording beam caused by various factors in accordance with the changing of the environmental temperature. By doing so, it becomes possible to ensure the stabilized image quality of the exposing apparatus itself, to reduce the processing accuracy concerning construction elements such as a drum, and to provide an apparatus whose price is further reduced.

It should be noted here that each embodiment described above of this aspect has been explained also by taking a light beam recording apparatus (exposing apparatus) that performs exposure using a light beam as an example of the light beam scanning apparatus. However, it is possible to apply each aspect of the present invention to a light beam reading apparatus that performs the reading of an image or the like using a light beam such as a laser beam.

Further, in this aspect, like in the second, third, sixth, and seventh aspects of the present invention, aberration in an optical system or blurring due to the changing of the aberration in the optical system in accordance with the changing of the environmental temperature may be compensated for by giving power and distortion to the wave front of the wavefront control device. Also, in addition to the aberration in the optical system and the blurring due to the aberration, longitudinal displacement of a light beam in accordance with the changing of the environmental temperature may be compensated for by doing the same. Further, in addition to the above, lateral displacement of the light beam in accordance with the changing of the environmental temperature may also be compensated for by tilting the wave front of the wavefront control device.

Next, a cylindrical internal surface scanning type light beam scanning apparatus and method according to the ninth and tenth aspects of the present invention will be described with reference to FIGS. 13 to 19.

Figure 13:
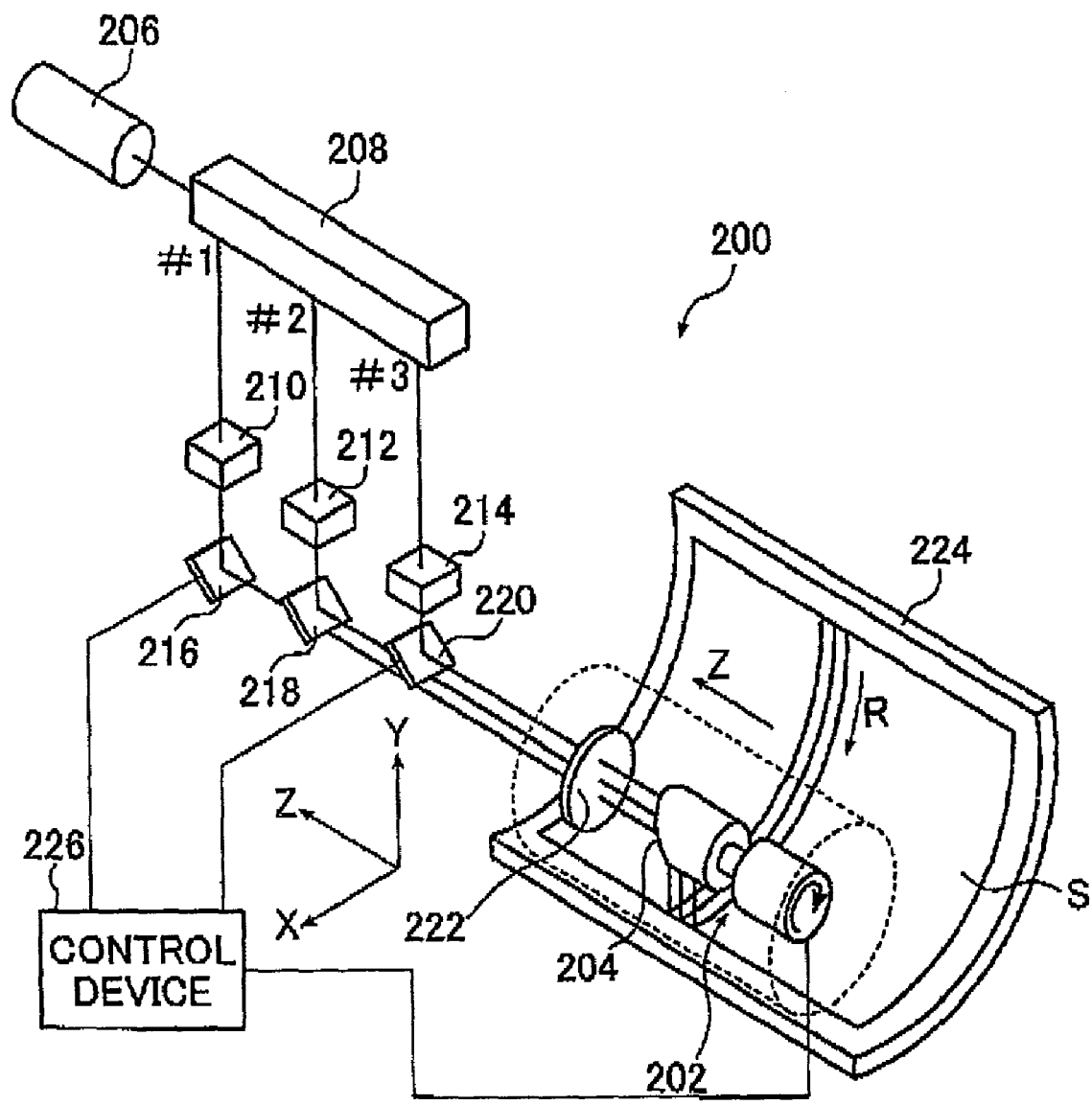
FIG. 13 is a simplified perspective view showing the construction of an example of an inner drum type image recording apparatus according to the ninth aspect of the present invention.

FIG. 13 shows an inner drum type image recording apparatus (hereinafter simply referred to as the "image recording apparatus") 200 that is an embodiment of the cylindrical internal surface scanning type light beam scanning apparatus of the ninth aspect of the present invention that carries out the cylindrical internal surface scanning type light beam scanning method according to the tenth aspect of the present invention.

This image recording apparatus 200 includes a laser beam generating apparatus 206 that generates a laser beam, a beam splitter 208 that divides the laser beam generated from this laser beam generating apparatus 206 into three laser beams #1, #2, and #3, an acoustic optical device 210 that modulates the laser beam #1 in accordance with image information, an acoustic optical device 212 that modulates the laser beam #2 in accordance with the image information, an acoustic optical device 214 that modulates the laser beam #3 in accordance with the image information, wavefront control devices (also referred to as the "light wavefront control devices") 216 and 220 that include reflection surfaces for reflecting the laser beams #1 and #3 and deflecting these laser beams in predetermined directions, a mirror 218 for reflecting the laser beam #2, a condensing lens 222 that condenses the laser beams #1, #2, and #3 reflected by the wavefront control devices 216 and 220 and the mirror 218, and a reflection surface 204 that rotates. The image recording apparatus 200 also includes a light scanner (spinner, also referred to as the "light deflector") 202 that reflects the laser beams #1, #2, and #3 and guides these laser beams onto a recording sheet S that is a photosensitive material recording medium, and a control device 226 for generating a control signal for controlling the shapes of the reflection surfaces of the wavefront control devices 216 and 220 in synchronism with the rotation of the reflection surface 204.

The recording sheet S is held on the cylindrical internal surface of the drum 224 and the light scanner 202 is disposed on the center axis of the drum 224. During the recording of an image using the laser beams #1, #2, and #3 in the main scanning direction, the light scanner 202 is moved in the auxiliary scanning direction in concert with the recording in the main scanning direction or each time recording operation in the main scanning direction is performed, thereby recording an image on the recording sheet S in a two-dimensional manner. Note that the drum 224 constitutes a part of a cylinder shape and it does not matter whether the cylinder of the present invention is the whole of the cylinder shape or a part thereof.

It should be noted here that in FIG. 13, the auxiliary scanning direction of the present apparatus 200 corresponds to the Z axial direction and the main scanning direction of the present apparatus 200 corresponds to the R direction.

Figure 14A:
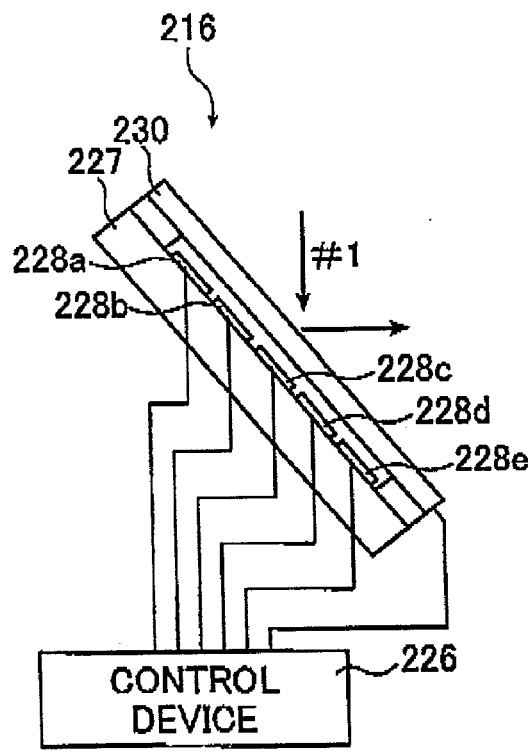
FIGS. 14A and 14B each illustrate a wavefront control device that is used in the inner drum type image recording apparatus according to the ninth aspect of the present invention.

FIG. 14A shows a concrete construction of the wavefront control device (face sheet mirror) of the electrostatic attractive force type as an example of the wavefront control device 216. Note that the wavefront control device 220 has the same construction.

Figure 14B:
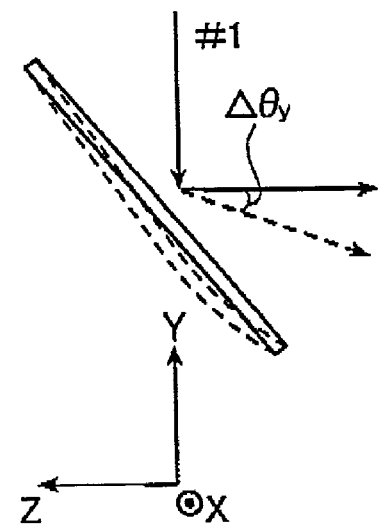

The wavefront control device 216 includes a plurality of microelectrodes 228 disposed on a substrate 227 in a two-dimensional manner (electrodes 228a, 228b, 2228c, 228d, and 228e in FIG. 14A), and a conductive film 230 that is provided so as to oppose these microelectrodes 228 with a fixed distance therebetween and is constructed of an aluminum thin film or the like whose surface is a mirror surface and constitutes a reflection surface. A voltage corresponding to a control signal generated by the control apparatus 226 is applied to the microelectrodes 228 and an electrostatic attractive force is generated between the microelectrodes 228 and the conductive film 230, so that the shape of the conductive film 230 functioning as a reflection surface changes into a desired shape. By doing so, there is freely changed the reflection direction of the laser beam striking the reflection surface and there is deflected the laser beam. For instance, as shown in FIG. 14B, by deforming the shape as indicated by the broken line so that the inclination angle is changed while maintaining the plane shape of the conductive film 230, it becomes possible to deflect the laser beam #1 striking the wavefront control device 216 in a direction shown by the broken line in the drawing (direction with a deflection angle of $\Delta\theta_y$). Also, in a like manner, by changing the inclination direction while maintaining the plane shape of the conductive film 230, it becomes possible to deflect the laser beam in the X direction in the drawing (direction with a deflection angle of $\Delta\theta_x$) Further, it becomes possible to deflect the laser beam in a direction with the deflection angles $\Delta\theta_y$ and $\Delta\theta_x$.

It is possible to easily produce the wavefront control device having the construction described above using the MEMS (Micro Electro Mechanical Systems) technique, which makes it possible to obtain the wavefront control device at low cost in comparison with the high-priced acoustic optical device, piezo device, and electrooptical device.

It should be noted here that the wavefront control device used in this aspect is not limited to the wavefront control devices 216 and 220 having the construction like this. That is, it is possible to use aforementioned various wavefront control devices used in the first to eighth aspects of the present invention in a like manner. Also, it is possible to use the wavefront control device having the construction like this in the aforementioned first to eighth aspects of the present invention in a like manner.

Figure 15A:
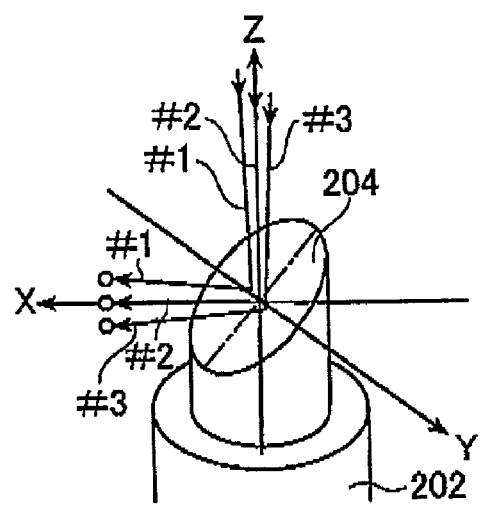
FIGS. 15A and 15B each illustrate a method of deflecting a light beam used by the inner drum type image recording apparatus according to the ninth aspect of the present invention.
Figure 15B:
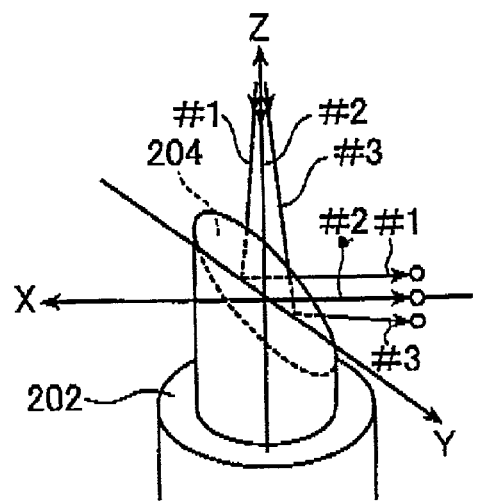

By using the wavefront control devices 216 and 220 like this, in the case where the reflection surface 204 of the light scanner 202 is placed in the state shown in FIG. 15A (in the case where the minor axis of the reflection surface 204 coincides with the Y axis), when the incident direction of the laser beam #1 striking the center of the reflection surface 204 along the Z axis with reference to the light scanner 202 is deflected by $-|\Delta\theta_x|$ in the X axial direction (deflected in the negative direction of the X axis), the reflected laser beam #1 is displaced in the Z direction by $+\Delta z$ within a surface perpendicular to the X axis (displaced in the positive direction of the Z axis). Also, when the laser beam #1 is deflected by $+|\Delta\theta_y|$ in the Y axial direction with reference to the light scanner 202 (deflected in the positive direction of the Y axis), the reflected laser beam #1 is displaced in the Y direction by $+\Delta y$ within a surface perpendicular to the X axis (displaced in the positive direction of the Y axis). Accordingly, by deflecting the laser beam in the X and Y axial directions in a two-dimensional manner, that is, by deflecting the laser beam by $\Delta\theta_x$ and $\Delta\theta_y$, it becomes possible to displace the reflected laser beam in the main scanning direction and the auxiliary scanning direction on the recording sheet S in a two-dimensional manner.

Therefore, by deflecting the laser beam #1 by a predetermined angle in the negative direction of the X axis and in the positive direction of the Y axis and by deflecting the laser beam #3 by a predetermined angle in the positive direction of the X axis and in the negative direction of the Y axis, it becomes possible to correct the reflected laser beams #1, #2, and #3 so as to be arranged on a line in the Z axial direction on the X-Z plane shown in FIG. 15A. In a like manner, in the case where the reflection surface 204 of the light scanner 202 is placed in the state shown in FIG. 15B, by deflecting the laser beam #1 by a predetermined angle in the positive direction of the X axis and in the positive direction of the Y axis and by deflecting the laser beam #3 by a predetermined angle in the negative direction of the X axis and in the negative direction of the Y axis, it becomes possible to correct the reflected laser beams #1, #2, and #3 so as to be arranged on a line in the Z-axial direction on the X-Z plane shown in FIG. 15B.

Figure 16A:
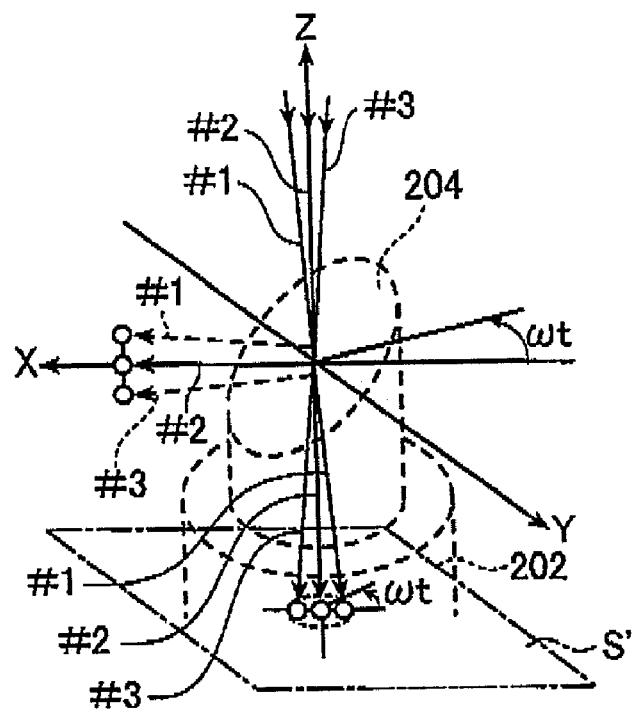
FIGS. 16A and 16B each illustrate a method of deflecting a light beam used by the inner drum type image recording apparatus according to the ninth aspect of the present invention.
Figure 16B:
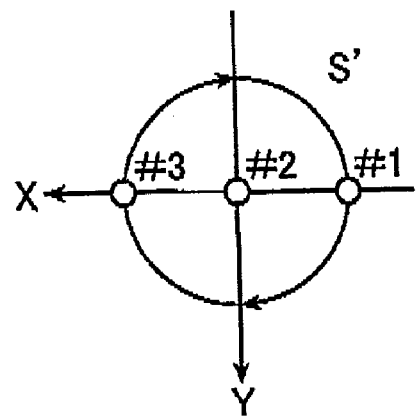
Figure 27:
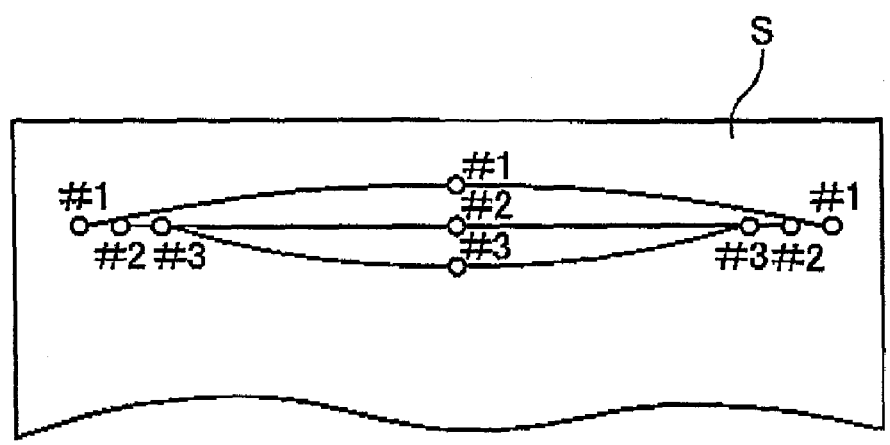
FIG. 27 is a diagram showing an example of lines recorded in the case where the deflection of laser beams is not controlled.
Figure 28A:
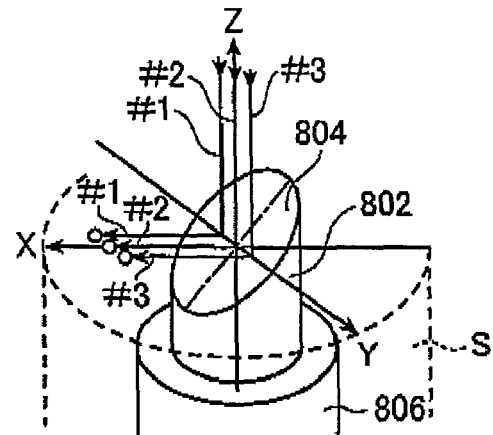
FIGS. 28A, 28B, and 28C each illustrate the reflection directions of laser beams in the case where the deflection of the laser beams is not controlled.
Figure 28B:
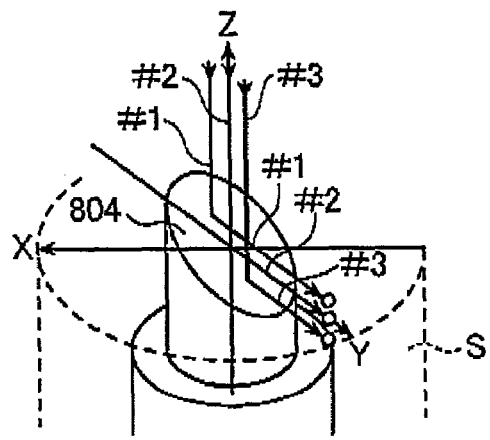
Figure 28C:
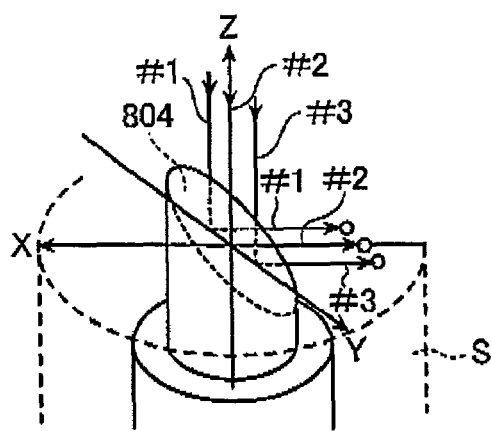

By adjusting the incident directions of the laser beams #1 and #3 with reference to the reflection surface 204 in a two-dimensional manner as described above, the reflection position on the reflection surface 204 is displaced, so that it becomes possible to displace the scanning position of the bent scanning line in the Z axial direction and to arrange the spots of the laser beams #1, #2, and #3 on the recording sheet S at regular intervals in the Z axial direction at all times, as shown in FIG. 27. Here, the deflection directions of the laser beams #1 and #3 striking the reflection surface 204 of the light scanner 202 will be described in more detail. In the case where the laser beams #1 and #3 are projected on a surface S' conjugate to the recording sheet S as shown in FIG. 16A, it is possible to achieve the deflection directions of the laser beams #1 and #3 by adjusting the wavefront control devices 216 and 220 in synchronism with the rotation of the light scanner 202 so that the path of the laser beams #1 and #3 on the surface S' in accordance with the rotation of the light scanner 202 forms a circle shape around the laser beam #2 as shown in FIG. 16B and the phase relation between the laser beams #1 and #3 becomes 180°.

That is, in the case where the path of the laser beam #1 becomes $(-a\cdot\cos(\omega\cdot t), -a\cdot\sin(\omega\cdot t))$ on the surface S', the deflection direction is set so that the path of the laser beam #3 becomes $(a\cdot\cos(\omega\cdot t), a\cdot\sin(\omega\cdot t))$ on the surface S'.

Figure 17:
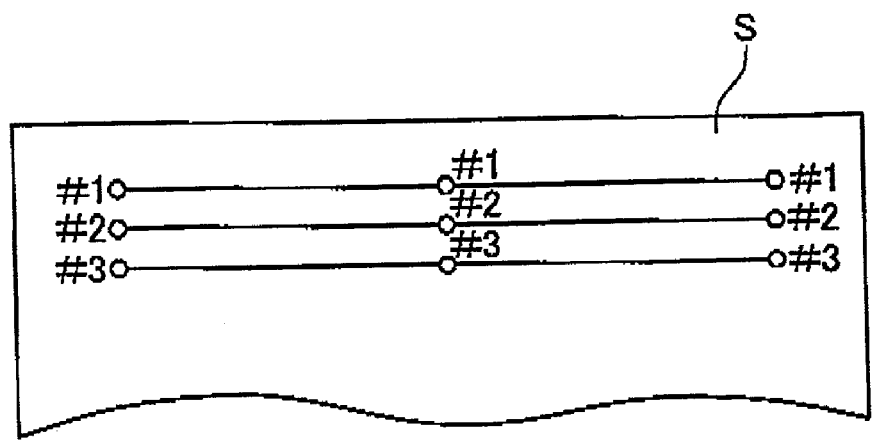
FIG. 17 is a diagram showing an example of lines recorded by the inner drum type image recording apparatus according to the ninth aspect of the present invention.

By doing so, as shown in FIG. 17, it becomes possible to dispose the spots of the laser beams #1, #2, and #3 on the recording sheet S at regular intervals in the Z axial direction at all times and there is also obtained the same scanning lengths thereof in the main scanning direction.

In the inner drum type image recording apparatus 200 like this, first, a laser beam outputted from the laser beam generator 206 is divided into three laser beams #1, #2, and #3 by the beam splitter 208. The divided laser beam #1 is subjected to on/off control by the acoustic optical device 210 in accordance with image information. Next, after being reflected and deflected by the wavefront control device 216 based on the control signal from the control apparatus 226, the laser beam #1 is guided to the light scanner 202 through the condensing lens 222. In this light scanner 202, the laser beam #1 is reflected by the reflection surface 204 that rotates about the Z axis and is guided to the recording sheet S. In a like manner, the laser beam #3 is also subjected to on/off control by the acoustic optical device 214 in accordance with the image information. Then, after being reflected and deflected by the wavefront control device 220 based on the control signal from the control apparatus 226, the laser beam #3 is guided to the light scanner 202 through the condensing lens 222. Following this, the laser beam #3 is reflected by the reflection surface 204 that rotates about the Z axis and is guided onto the recording sheet S.

On the other hand, the laser beam #2 is guided along the rotation axis of the light scanner 202, so that after being subjected to on/off control by the acoustic optical device 212 in accordance with the image information, the laser beam #2 is guided to the recording sheet S through the mirror 218, the condensing lens 222, and the light scanner 202. Then, as shown in FIG. 17, parallel scanning having constant intervals and constant lengths is performed on the recording sheet S.

Here, the control of the deflection directions of the laser beams #1 and #3 will be described. The control circuit 226 generates a control clock signal based on a positional signal from an unillustrated encoder provided for the light scanner 202 and there are obtained the deflection directions of the laser beams #1 and #3 from this control clock signal. Following this, there is set the inclination angle of the conductive film 230 of the wavefront control devices 216 and 220 functioning as a reflection surface, and there is generated a control signal for applying a voltage to microelectrodes of the wavefront control devices 216 and 220. In this manner, a voltage is applied to the wavefront control devices 216 and 220.

As a result, the laser beam #1 guided to the reflection surface 204 of the light scanner 202 draws an approximately circular path on the surface S' perpendicular to the rotation axis of the light scanner 202 in synchronism with the rotational operation of the light scanner 202, as shown in FIG. 16B.

In a like manner, the laser beam #3 draws an approximately circular path under a condition where its phase is shifted from the phase of the laser beam #1 by 180°, as shown in FIG. 16B. Note that the laser beam #2 is subjected only to on/off control by a binary image signal without moving its position on the surface S'. In this manner, the laser beam #2 is guided onto the recording sheet S. In this manner, the laser beams #1, #2, and #3, whose intervals are controlled so as to be constant, are guided to the recording sheet S, as shown in FIG. 17. As a result, there is performed image recording. It is possible to easily adjust the scanning intervals between the laser beams #1 to #3 by the magnitude of the angle of the deflection direction set by the control apparatus 226.

In the example described above, one wavefront control device for adjusting a deflection direction in a two-dimensional manner and one acoustic optical device for modulating a laser beam are used for each of the laser beams. Accordingly, in comparison with a conventional case where two high-priced acoustic optical devices, electrooptical devices, or piezo devices are required for each laser beam in order to adjust the deflection direction in a two-dimensional manner, it becomes possible to suppress the cost and to provide a practical apparatus.

Figure 18:
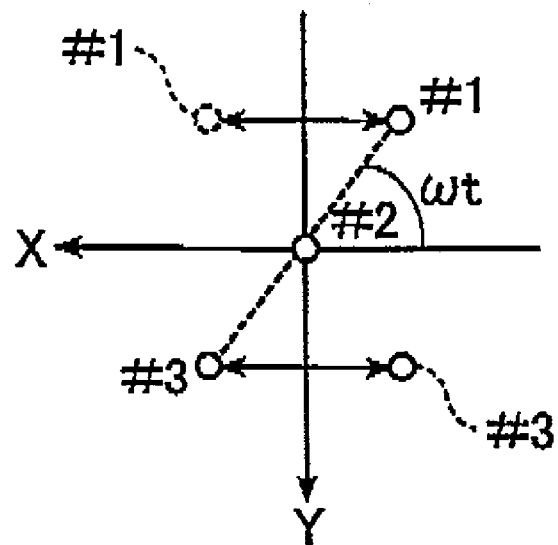
FIG. 18 is a diagram illustrating another method of deflecting a light beam used by the inner drum type image recording apparatus according to the ninth aspect of the present invention.
Figure 19:
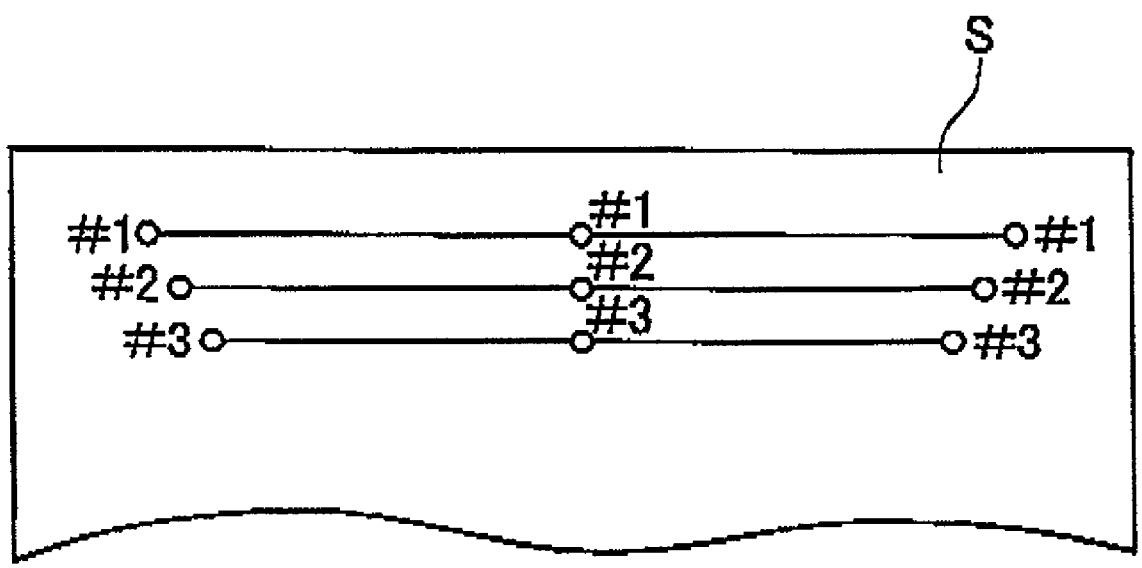
FIG. 19 is a diagram showing another example of the lines recorded by the inner drum type image recording apparatus according to the ninth aspect of the present invention.
Figure 20:
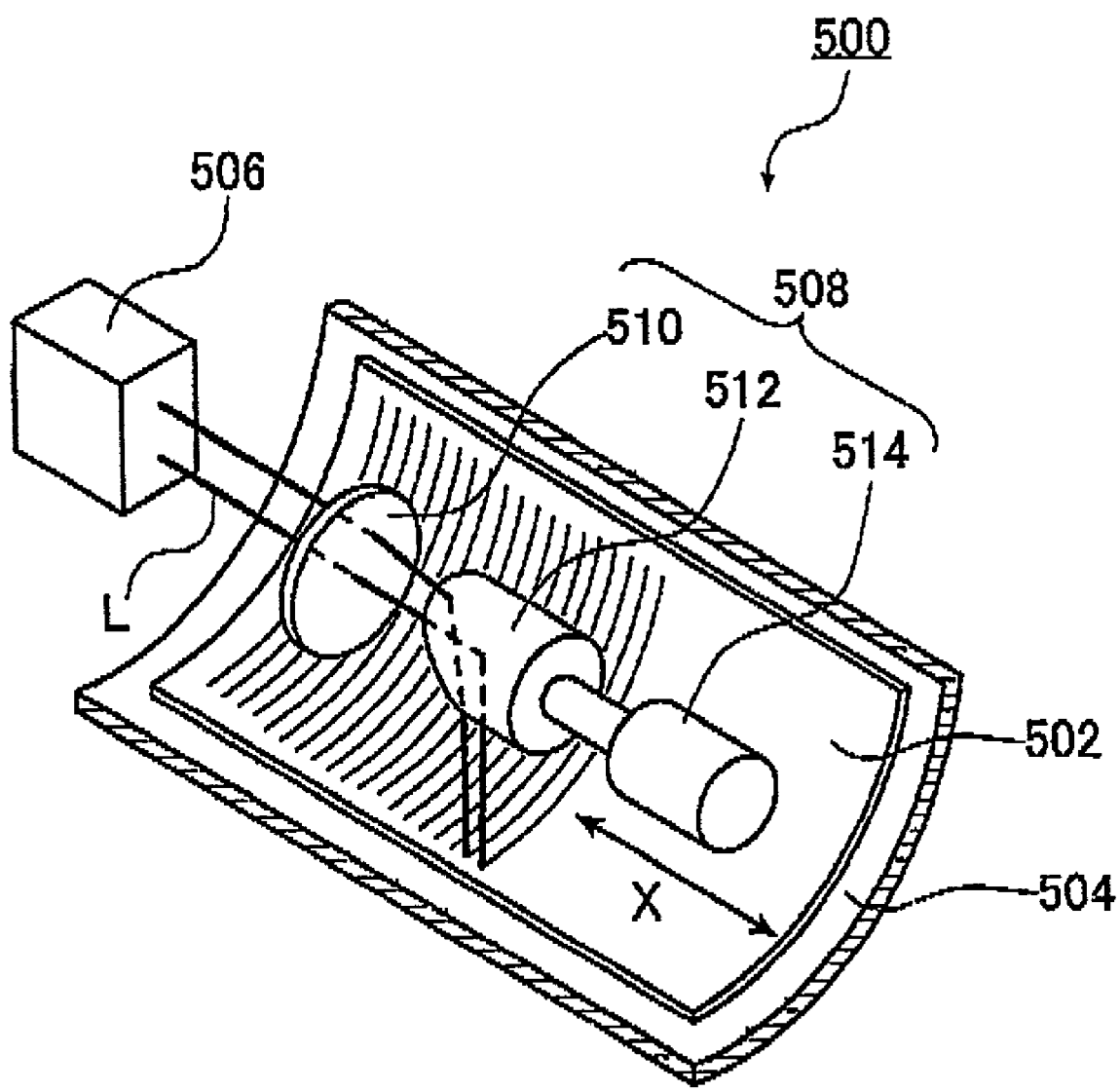
FIG. 20 is a perspective view showing the outline of a conventional inner drum type light beam scanning apparatus.
Figure 21:
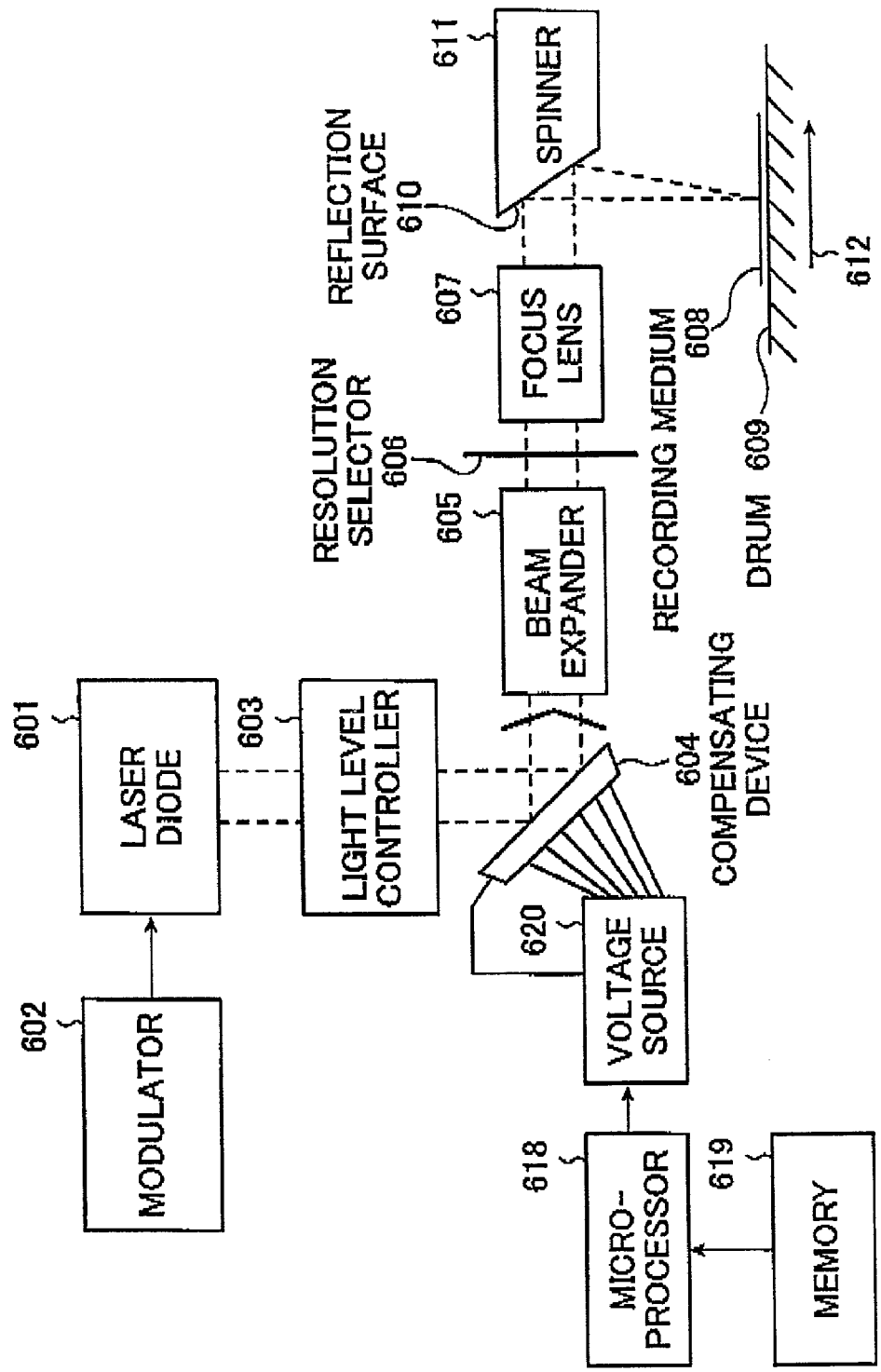
FIG. 21 is a block diagram showing the outline of a conventional inner drum type light beam scanning apparatus that compensates for distortion in a beam wave front caused by a spinner.
Figure 22:
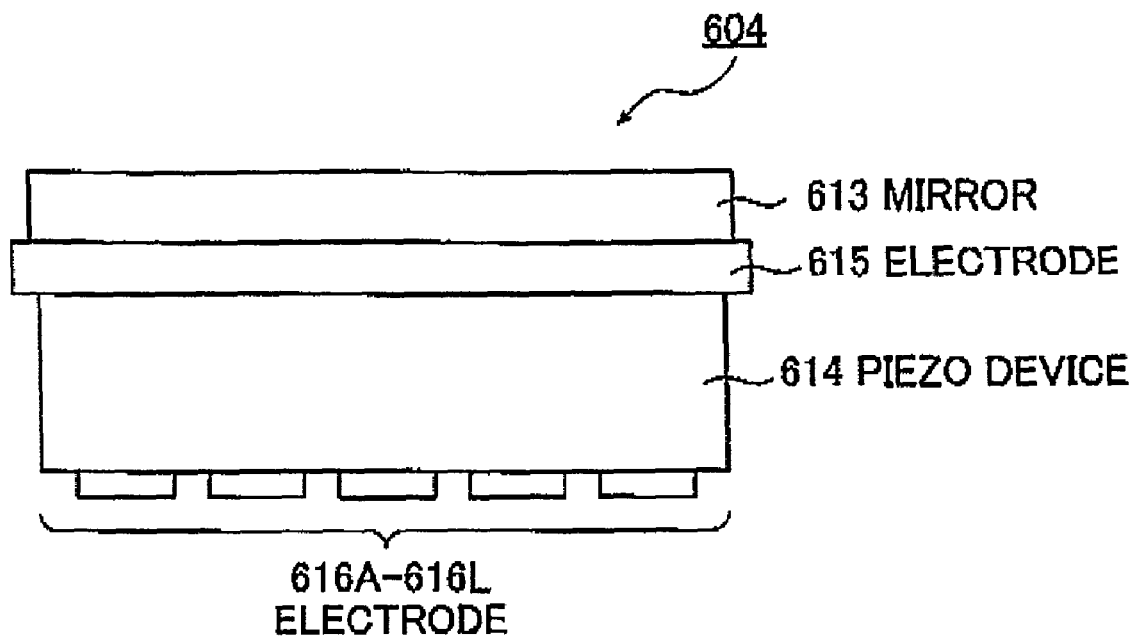
FIG. 22 is a construction diagram showing the outline of a compensating device in FIG. 21.
Figure 23:
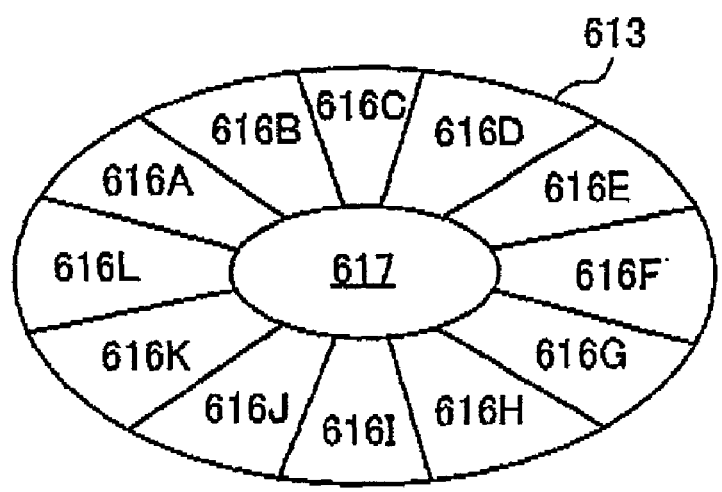
FIG. 23 is a plan view that shows the compensating device in FIG. 21.
Figure 24:
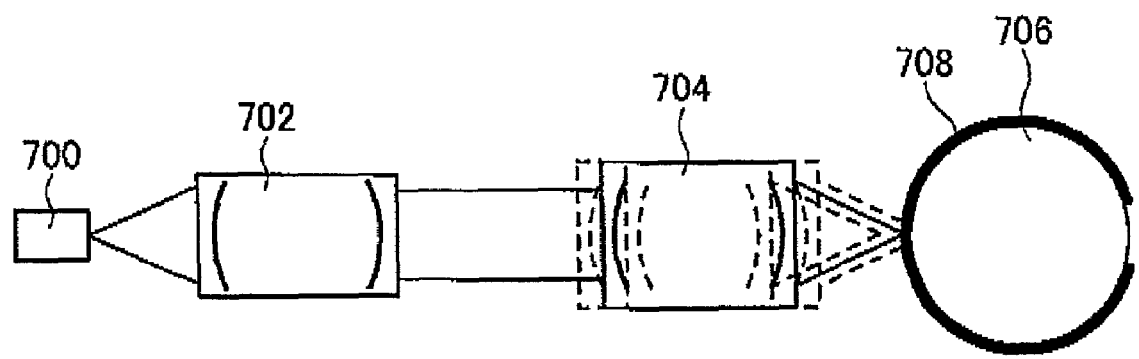
FIG. 24 is a simplified construction diagram showing an example of a conventional outer drum type light beam scanning apparatus and an explanatory diagram illustrating a method of compensating for longitudinal displacement in this apparatus.
Figure 25:
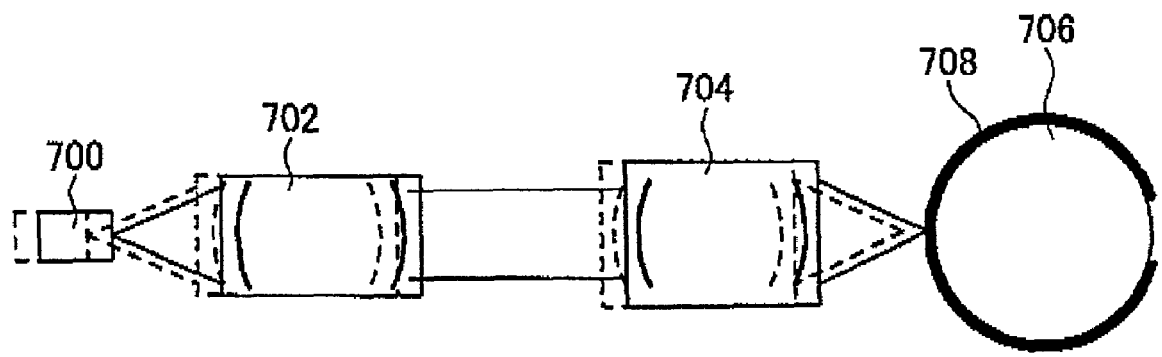
FIG. 25 is also a simplified construction diagram showing another example of the conventional outer drum type light beam scanning apparatus.
Figure 26:
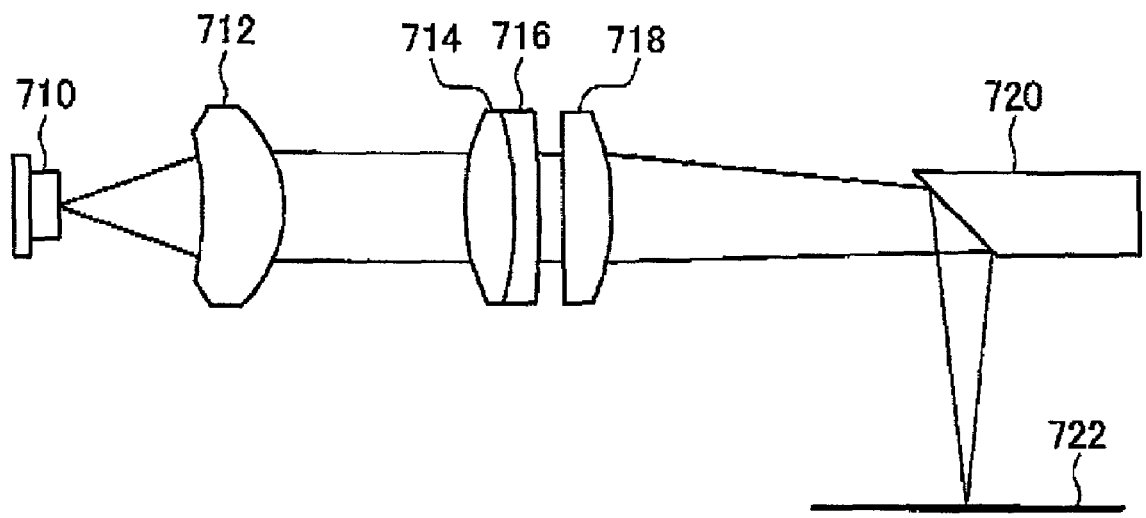
FIG. 26 is an explanatory diagram showing a method of compensating for longitudinal displacement in the conventional inner drum type light beam scanning apparatus.

It should be noted here that in the embodiment described above, there has been described a method with which the wavefront control devices 216 and 220 are adjusted so that the laser beams #1 and #3 move two-dimensionally in an approximate circle manner around the laser beam #2 that coincides with the rotation axis of the light scanner 202. In the present invention, however, the wavefront control devices 216 and 220 may be adjusted so that the spots of the laser beams #1 and #3 move in a straight manner in the X direction on the surface S' conjugate to the recording sheet S, as shown in FIG. 18. By doing so, it becomes possible to displace the scanning position of a bent scanning line in the Z axial direction as shown in FIG. 27 and to have the scanning intervals on the recording sheet S remain constant regardless of the main scanning position as shown in FIG. 19. In this case, a control clock signal is generated by the control circuit 226 based on the positional signal from an unillustrated encoder provided for the light scanner 202 and the timing of the control signal for controlling the wavefront control devices 216 and 220 is adjusted and the timing of image recording is controlled based on this control clock signal, thereby shortening or elongating the scanning lengths. By doing so, the scanning intervals become constant and the scanning lengths also become constant, as shown in FIG. 17.

Also, in order to change the deflection direction of a laser beam, each wavefront control device in the example described above performs so-called tilt adjustment where the inclination angle is changed while maintaining a plane shape. However, the wavefront control device may resolve the "degradation in a condensing spot diameter" of a laser beam on the recording sheet S by giving optical power through the deformation of the reflection surface of the wavefront control device so as to have a curvature. Here, the "degradation in the condensing spot diameter" is caused, for instance, by the shifting from the roundness of a cylinder shape of the drum 224 (eccentricity of the drum or error from the roundness), the non-straight property of the moving direction when the light scanner 202 moves in the auxiliary scanning direction, the shifting of this moving direction from a direction of the center axis of the drum 224 (parallel shifting or inclination), the defocus caused by various errors of the apparatus such as the variations in the thickness of the recording sheet S, aberration in the optical system such as astigmatism where the condensing position of a light flux emitted from an off-axis object point on a sagittal plane does not coincide with the condensing position on a tangential plane, and coma aberration caused by the distortion of the cross-section shape of the reflection surface 204 in a tertiary curve manner in accordance with the rotation of the light scanner 202. In the case where the "degradation in the condensing spot diameter" is caused by the astigmatism described above, it is enough that there is performed adjustment by changing vertical and horizontal optical power of the reflection surface 204 of the light scanner 202. In the case where the "degradation in the condensing spot diameter" is caused by the coma aberration described above, it is enough that the adjustment is performed by changing optical power in accordance with a cross-section shape obtained through the deformation of the reflection surface 204.

Further, the "lateral displacement" of a laser beam on the recording sheet S caused by errors in the apparatus described above may be precisely adjusted through the tilt adjustment described above. In this case, it is enough that a wavefront control device is used in place of the mirror for the laser beam #2.

The light beam scanning method and apparatus of the present invention have been described in detail above based on various embodiments. However, the present invention is not limited to the embodiments described above and, needless to say, it is possible to make various kinds of modifications and changes of the design without departing from the gist of the present invention.

As has been described in detail above, according to the first and fifth aspects of the present invention, it becomes possible to compensate for longitudinal displacement (defocus) of a light beam caused by various factors or the degradation in a condensing spot shape or lateral displacement of a light beam due to aberration in an optical system with a simple construction and to obtain a high-quality image with a low-priced apparatus.

Also, as has been described in detail above, according to the second and sixth aspects of the present invention, it becomes possible to obtain the effects described above in a light beam scanning of the cylindrical internal surface scanning type. That is, it becomes possible to compensate for longitudinal displacement (defocus) of a light beam caused by various factors or the degradation in a condensing spot shape or lateral displacement of a light beam due to aberration in an optical system with a simple construction and to obtain a high-quality image with a low-priced apparatus.

As has been described in detail above, according to the third and seventh aspects of the present invention, it becomes possible to compensate for lateral displacement and longitudinal displacement of a light beam and aberration in an optical system using a wavefront control device. Consequently, it becomes possible to reduce the processing accuracy concerning construction elements such as the drum. Also, it becomes possible to easily compensate for lateral displacement and longitudinal displacement of a light beam caused by various factors and aberration in an optical system with an apparatus, whose price is further reduced, in light beam scanning of the cylindrical external surface scanning type. Further, there is not performed mechanical moving of a heavy-weighted lens or the like, so that it becomes possible to suppress redundant vibrations and to reduce a driving current.

As has been described in detail above, according to the fourth and eighth aspects of the present invention, it becomes possible to ensure stabilized image quality of the light beam scanning apparatus itself by compensating for lateral displacement and longitudinal displacement of a recording light beam and aberration in the optical system caused by various factors in accordance with the changing of a temperature in the light beam scanning apparatus. Also, it becomes possible to reduce the processing accuracy of a drum and a head and the processing accuracy of other various construction elements, which makes it possible to further reduce the price of the apparatus.

Also, it is not required to select the glass material for the lens unlike in the conventional case, so that no limitation is imposed on the lens glass material, which avoids a situation where the beam quality is degraded. Further, there is not performed the mechanical moving of a heavy-weighted lens, so that it becomes possible to ensure the stability of the system.

As has been described in detail above, according to the ninth and tenth aspects of the present invention, a wavefront control device is used in order to deflect a laser beam, so that it becomes possible to produce a practical cylindrical internal surface scanning type light beam scanning apparatus, such as a cylindrical internal surface scanning type image recording apparatus, whose cost is suppressed and which performs scanning using a plurality of light beams.

Also, it is possible to adjust longitudinal displacement (defocus) of a light beam caused by various factors, the degradation in a condensing spot shape (diameter, for instance) due to aberration in an optical system, and lateral displacement of a light beam at the same time using a wavefront control device. As a result, it becomes possible to relax the permissible amount concerning an error during the production of a cylindrical internal surface scanning type light beam scanning apparatus such as a cylindrical internal surface scanning type image recording apparatus, to suppress the processing cost and adjusting cost of construction elements of the apparatus, and to reduce the overall cost of the apparatus.

What is claimed is:

1. A light beam scanning method of scanning a sheet-like object to be scanned by a light beam emitted from a light source and having passed through an optical system, comprising the steps of:
    disposing the sheet-like object along a curved receiving surface wherein the light beam forms on the sheet-like object a scanning line curved along the curved receiving surface;
    controlling a wave front of the light beam using a wavefront control device; and
    compensating at least one of lateral displacement of the light beam, longitudinal displacement of the light beam, and aberration in the optical system,
    wherein at least one of: compensation for the longitudinal displacement of the light beam by controlling one of curvature and distortion of the wave front of the light beam emitted from the wavefront control device: compensation for the aberration in the optical system by controlling either of the curvature and the distortion of the wave front of the light beam emitted from the wavefront control device; and compensation for the lateral displacement of the light beam by controlling inclination of the wave front of the light beam emitted from the wavefront control device, is performed.

2. The light beam scanning method according to claim 1, having a cylindrical internal surface scanning type, and wherein said sheet-like object to be scanned is held on a cylindrical internal peripheral surface and is scanned by the light beam emitted from the light source, having passed through the optical system, and reflected and deflected by a rotary light deflector.

3. The light beam scanning method according to claim 1, having a cylindrical external surface scanning type, and wherein said sheet-like object to be scanned is wound around an external surface of a drum rotating at constant speed and is scanned by the light beam emitted from the light source and having passed through the optical system.

4. The light beam scanning method according to claim 1, wherein degradation in a spot shape of the light beam is caused by at least one of the longitudinal displacement of the light beam and the aberration in the optical system.

5. The light beam scanning method according to claim 4, wherein said degradation in the spot shape of the light beam is compensated for by controlling one of curvature and distortion of the wave front of the light beam emitted from the wavefront control device.

6. The light beam scanning method according to claim 1, wherein at least two of: compensation for a longitudinal displacement of the light beam by controlling one of curvature and distortion of the wave front of the light beam emitted from the wavefront control device; compensation for the aberration in the optical system by controlling either of the curvature and the distortion of the wave front of the light beam emitted from the wavefront control device; and compensation for lateral displacement of the light beam by controlling inclination of the wave front of the light beam emitted from the wavefront control device, are combined with each other.

7. The light beam scanning method according to claim 1, wherein said wavefront control device is one of a piezo type, an electrostriction type, an electrostatic attractive force type, and a liquid crystal type.

8. The light beam scanning method according to claim 1, wherein said sheet-like object to be scanned is a sheet-like recording medium; said light beam is a recording light beam; and an image is recorded on the sheet-like recording medium by scanning the sheet-like recording medium in a two-dimensional manner using the recording light beam.

9. The method of claim 1, wherein compensating of the light beam includes at least correction for aberration in the optical system and at least one of the lateral displacement of the light beam and the longitudinal displacement of the light beam.

10. The method of claim 1, wherein the wavefront control device comprises a light transmissive device.

11. The light beam scanning method according to claim 1, wherein the lateral displacement of the light beam comprises displacement of a spot of the light beam on the sheet-like object and the longitudinal displacement of the light beam comprises displacement of a focal point of the light beam on the sheet-like object.

12. A light beam scanning method for scanning a sheet-like object to be scanned by a light beam emitted from a light source and having passed through an optical system comprising:
controlling a wave front of the light beam using a wavefront control device; compensating at least one of lateral displacement of the light beam, longitudinal displacement of the light beam, and aberration in the optical system; and
measuring an environmental temperature for performing the scanning by the light beam,
wherein said wave front of the light beam is controlled with the wavefront control device based on the measured environmental temperature, and said at least one of the lateral displacement of the light beam, the longitudinal displacement of the light beam, and the aberration in the optical system that are caused by change of the environmental temperature is compensated.

13. A light beam scanning method for scanning a sheet-like object to be scanned by a light beam emitted from a light source and having passed through an optical system comprising:
controlling a wave front of the light beam using a wavefront control device; and
compensating at least one of lateral displacement of the light beam, longitudinal displacement of the light beam, and aberration in the optical system,
wherein the lateral displacement of the light beam is compensated for by controlling inclination of the wave front of the light beam emitted from the wavefront control device.

14. A light beam scanning method for scanning a sheet-like object to be scanned by a light beam emitted from a light source and having passed through an optical system comprising:
controlling a wave front of the light beam using a wavefront control device; and
compensating at least one of lateral displacement of the light beam, longitudinal displacement of the light beam, and aberration in the optical system,
wherein said wavefront control device includes a plurality of electrodes disposed on a surface of a substrate and a deformable conductive film that opposes the electrodes and has a surface that functions as a reflection surface, and said reflection surface is formed to have a desired shape by generating an electrostatic attractive force through application of a voltage to the electrodes and by deforming the conductive film.

15. A light beam scanning apparatus, comprising:
a light source that emits a light beam;
an optical system through which the light beam emitted from the light source passes;
a wavefront control device that compensates at least one of lateral displacement of the light beam, longitudinal displacement of the light beam, and aberration in the optical system by controlling a wave front of the light beam, and
a curved receiving surface wherein
a sheet-like object to be scanned disposed on the curved receiving surface is scanned by the light beam emitted from the light source, having passed through the optical system, and compensated by the wavefront control device and
the light beam forms on the sheet-like object a scanning line curved along the curved receiving surface, and wherein
said wavefront control device performs at least one of: compensation for the longitudinal displacement of the light beam by controlling one of curvature and distortion of the wave front of the light beam emitted; compensation for the aberration in the optical system by controlling one of the curvature and the distortion of the wave front of the light beam emitted; and compensation for the lateral displacement of the light beam by controlling inclination of the wave front of the light beam emitted.

16. The light beam scanning apparatus according to claim 15, which is a cylindrical internal surface scanning type, further comprising:
a drum on whose cylindrical internal peripheral surface the sheet-like object to be scanned is held; and
a rotary light deflector that is rotated to reflect and deflect the light beam and to scan the sheet-like object to be scanned, wherein
said wavefront control device is installed on an upstream side with reference to the rotary light deflector in a direction in which the light beam advances.

17. The light beam scanning apparatus according to claim 15, which is a cylindrical external surface scanning type, further comprising:
a drum on whose external surface the sheet-like object is wound around and which rotates at a constant speed.

18. The light beam scanning apparatus according to claim 15,
wherein degradation in a spot shape of the light beam is caused by at least one of the longitudinal displacement of the light beam and the aberration in the optical system.

19. The light beam scanning apparatus according to claim 15,
wherein said wavefront control device controls one of curvature and distortion of the wave front of the light beam emitted to compensate the degradation in the spot shape of the light beam.

20. The light beam scanning apparatus according to claim 15,
wherein said wavefront control device combines at least two of: compensation for a longitudinal displacement of the light beam by controlling one of curvature and distortion of the wave front of the light beam emitted;

compensation for the aberration in the optical system by controlling one of the power and the distortion of the wave front of the light beam emitted;

and compensation for lateral displacement of the light beam by controlling inclination of the wave front of the light beam emitted.

21. The light beam scanning apparatus according to claim 15, wherein said wavefront control device is one of a piezo type, an electrostriction type, an electrostatic attractive force type, and a liquid crystal type.

22. The light beam scanning apparatus according to claim 15, wherein said sheet-like object to be scanned is a sheet-like recording medium, said light beam is a recording light beam, and an image is recorded on the sheet-like recording medium by scanning the sheet-like recording medium in a two-dimensional manner using the recording light beam.

23. The apparatus of claim 15, wherein the wavefront control device compensates at least correction for aberration in the optical system and at least one of the lateral displacement of the light beam and the longitudinal displacement of the light beam.

24. The apparatus of claim 15, wherein the wavefront control device comprises a light transmissive device.

25. The apparatus of claim 15, wherein the wavefront control device comprises a light reflective element.

26. The apparatus of claim 15, wherein the longitudinal displacement comprises at least one of error resulting from deviation in eccentricity of the curved receiving surface, variations in thickness of the sheet like object, and displacement of the light source.

27. The light beam scanning apparatus according to claim 15, wherein the lateral displacement of the light beam comprises displacement of a spot of the light beam on the sheet-like object and the longitudinal displacement of the light beam comprises displacement of a focal point of the light beam on the sheet-like object.

28. A light beam scanning apparatus comprising:

a light source that emits a light beam;

an optical system through which the light beam emitted from the light source passes;

a wavefront control device that compensates at least one of lateral displacement of the light beam, longitudinal displacement of the light beam, and aberration in the optical system by controlling a wave front of the light beam;

a temperature sensor for measuring an environmental temperature of the light beam scanning apparatus; and control means for controlling the wavefront control device based on the measured environmental temperature, wherein a sheet-like object to be scanned is scanned by the light beam emitted from the light source, having passed through the optical system, and compensated by the wavefront control device, and wherein said at least one of the lateral displacement of the light beam, the longitudinal displacement of the light beam, and the aberration in the optical system that are caused by change of the environmental temperature is compensated by controlling the wavefront control device by the control means and thereby controlling the wave front of the light beam by the wavefront control device.

29. A light beam scanning apparatus comprising: a light source that emits a light beam;

an optical system through which the light beam emitted from the light source passes; and a wavefront control device that compensates at least one of lateral displacement of the light beam, longitudinal displacement of the light beam, and aberration in the optical system by controlling a wave front of the light beam, wherein a sheet-like object to be scanned is scanned by the light beam emitted from the light source, having passed through the optical system, and compensated by the wavefront control device, and wherein said wavefront control device controls inclination of the wave front of the light beam emitted to compensate for the lateral displacement of the light beam.

30. A light beam scanning apparatus comprising:

a light source that emits a light beam;

an optical system through which the light beam emitted from the light source passes; and a wavefront control device that compensates at least one of lateral displacement of the light beam, longitudinal displacement of the light beam, and aberration in the optical system by controlling a wave front of the light beam, wherein a sheet-like object to be scanned is scanned by the light beam emitted from the light source, having passed through the optical system, and compensated by the wavefront control device, said wavefront control device includes a plurality of electrodes disposed on a surface of a substrate and a deformable conductive film that opposes the electrodes and has a surface that functions as a reflection surface, and said reflection surface is formed to have a desired shape by generating an electrostatic attractive force through application of a voltage to the electrodes and by deforming the conductive film.

31. A cylindrical internal surface scanning type light beam scanning apparatus, comprising:

a drum on whose cylindrical internal peripheral surface a sheet-like object to be scanned is held;

an optical system that images light beams on the sheet-like object to be scanned;

a rotary light deflector that has a first reflection surface which rotates about a rotation axis that is a center axis of the cylindrical internal peripheral surface, reflects a plurality of light beams with the rotating first reflection surface, and subject the sheet-like object to be scanned to main scanning with said plurality of reflected light beams;

a wavefront control device that displaces at least a scanning position on the sheet-like object to be scanned in an auxiliary scanning direction parallel to said rotation axis by controlling a wave front of at least one light beam among said plurality of light beams and by reflecting and deflecting said at least one light beam; and control means for controlling said scanning position displaced by the wavefront control device in synchronism with rotation of said first reflection surface.

32. The light beam scanning apparatus according to claim 31, wherein said wavefront control device is one of a piezo type, an electrostriction type, an electrostatic attractive force type, and a liquid crystal type.

33. The light beam scanning apparatus according to claim 31,
wherein said wavefront control device includes a plurality of electrodes disposed on a surface of a substrate and a deformable conductive film that opposes the electrodes and has a surface that functions as a second reflection surface, and
said second reflection surface is formed to have a desired shape by generating an electrostatic attractive force through application of a voltage to the electrodes and by deforming the conductive film.

34. The light beam scanning apparatus according to claim 31,
wherein said wavefront control device displaces the scanning position on the sheet-like object to be scanned in a main scanning direction and the auxiliary scanning direction by performing deflection of said at least one light beam in a two-dimensional manner.

35. The light beam scanning apparatus according to claim 31,
wherein said wavefront control device further compensates at least one of lateral displacement of the light beam, longitudinal displacement of the light beam, and aberration in the optical system by controlling a wave front of the at least one light beam.

36. The light beam scanning apparatus according to claim 31,
wherein said sheet-like object to be scanned is a sheet-like recording medium,
said plurality of light beams are a plurality of light beams modulated in accordance with image information, and
said light beam scanning apparatus is a cylindrical internal surface scanning type image recording apparatus that records an image on the sheet-like recording medium by scanning the sheet-like recording medium with said plurality of modulated light beams in a two-dimensional manner.

37. A light beam scanning method that reflects a plurality of light beams emitted from a light source and having passed through an optical system with a first reflection surface of a rotating rotary light deflector and scans a sheet-like object to be scanned held on a cylindrical internal peripheral surface that is concentrically with the rotary deflector by said plurality of reflected light beams, comprising the steps of:
controlling a wave front of at least one light beam among said plurality of light beams with a wavefront control device in synchronism with rotation of the first reflection surface;
reflecting and deflecting said at least one light beam in synchronism with the rotation of the first reflection surface; and
displacing at least a scanning position on the sheet-like object to be scanned in an auxiliary scanning direction parallel to a rotation axis of the rotary deflector.

38. The light beam scanning method according to claim 37,
wherein said wavefront control device is one of a piezo type, an electrostriction type, an electrostatic attractive force type, and a liquid crystal type.

39. The light beam scanning method according to claim 37,
wherein said wavefront control device includes a plurality of electrodes disposed on a surface of a substrate and a deformable conductive film that opposes the electrodes and has a surface that functions as a second reflection surface, and
said second reflection surface is formed to have a desired shape by generating an electrostatic attractive force through application of a voltage to the electrodes and by deforming the conductive film.

40. The light beam scanning method according to claim 37,
wherein said scanning position on the sheet-like object to be scanned is displaced in a main scanning direction and the auxiliary scanning direction by performing deflection of the at least one light beam in a two-dimensional manner by the wavefront control device.

41. The light beam scanning method according to claim 37, further comprising the steps of:
controlling a wave front of said at least one light beam by the wavefront control device; and
compensating at least one of lateral displacement of the light beam, longitudinal displacement of the light beam, and aberration in the optical system.

42. The light beam scanning method according to claim 37,
wherein said sheet-like object to be scanned is a sheet-like recording medium,
said plurality of light beams are a plurality of light beams modulated in accordance with image information, and
said light beam scanning apparatus records an image on the sheet-like recording medium by scanning the sheet-like recording medium using said plurality of modulated light beams in a two-dimensional manner.

43. A light beam scanning method for scanning a sheet-like object to be scanned by a light beam emitted from a light source and having passed through an optical system comprising:
controlling a wave front of the light beam using a wavefront control device; and
compensating at least one of lateral displacement of the light beam, longitudinal displacement of the light beam, and aberration in the optical system,
wherein the aberration in the optical system relates to aberration of one or more lenses physically separated from the light source and disposed downstream of the light source.

44. A light beam scanning method for scanning a sheet-like object to be scanned by a light beam emitted from a light source and having passed through an optical system comprising:
controlling a wave front of the light beam using a wavefront control device; and
compensating at least one of lateral displacement of the light beam, longitudinal displacement of the light beam, and aberration in the optical system,
wherein the optical system includes at least one lens disposed upstream of the wavefront control device and one lens downstream of the wavefront control device.

45. A light beam scanning apparatus comprising:
a light source that emits a light beam;
an optical system through which the light beam emitted from the light source passes; and
a wavefront control device that compensates at least one of lateral displacement of the light beam, longitudinal displacement of the light beam, and aberration in the optical system by controlling a wave front of the light beam, wherein a sheet-like object to be scanned is scanned by the light beam emitted from the light source, having passed through the optical system, and compensated by the wavefront control device, and wherein the aberration in the optical system relates to aberration of one or more lenses physically separated from the light source and disposed downstream of the light source.

46. A light beam scanning apparatus comprising:

a light source that emits a light beam;

an optical system through which the light beam emitted from the light source passes; and a wavefront control device that compensates at least one of lateral displacement of the light beam, longitudinal displacement of the light beam, and aberration in the optical system by controlling a wave front of the light beam, wherein a sheet-like object to be scanned is scanned by the light beam emitted from the light source, having passed through the optical system, and compensated by the wavefront control device, and wherein the optical system includes at least one lens disposed upstream of the wavefront control device and one lens downstream of the wavefront control device.

* * * * *